United States Patent
Hong et al.

(10) Patent No.: US 9,312,046 B2
(45) Date of Patent: Apr. 12, 2016

(54) COMPOSITE MATERIALS WITH MAGNETICALLY ALIGNED CARBON NANOPARTICLES HAVING ENHANCED ELECTRICAL PROPERTIES AND METHODS OF PREPARATION

(71) Applicants: SOUTH DAKOTA BOARD OF REGENTS, Pierre, SD (US); GEORGIA TECH RESEARCH CORPORATION, Atlanta, GA (US)

(72) Inventors: Haiping Hong, Rapid City, SD (US); G.P. (Bud) Peterson, Atlanta, GA (US); David R. Salem, Rapid City, SD (US)

(73) Assignees: South Dakota Board of Regents, Pierre, SD (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/577,552

(22) Filed: Dec. 19, 2014

(65) Prior Publication Data

US 2015/0302948 A1  Oct. 22, 2015

Related U.S. Application Data

(63) Continuation-in-part of application No. 14/178,948, filed on Feb. 12, 2014.

(51) Int. Cl.
*H01B 1/24* (2006.01)
*H01F 1/01* (2006.01)
(Continued)

(52) U.S. Cl.
CPC .. *H01B 1/24* (2013.01); *C08K 3/04* (2013.01); *H01B 1/04* (2013.01); *H01F 1/01* (2013.01); *C08K 2003/2265* (2013.01); *C08K 2003/2272* (2013.01); *C08K 2003/2275* (2013.01); *C08K 2003/2289* (2013.01); *C08K 2003/2293* (2013.01); *C08K 2201/011* (2013.01)

(58) Field of Classification Search
CPC .............. C08K 2003/2265; C08K 2003/2272; C08K 2003/2275; C08K 2003/2289; C08K 2003/2293
See application file for complete search history.

(56) References Cited

U.S. PATENT DOCUMENTS 6,372,077 B1   4/2002   Tecle
6,585,796 B2   7/2003   Hosokura et al.
(Continued)

FOREIGN PATENT DOCUMENTS

CN   1743387   3/2006
CN   1803858   7/2006
(Continued)

OTHER PUBLICATIONS

Choi et al., "Enhancement of thermal and electrical properties of carbon nanotube polymer composites by magnetic field processing," J. Appl. Phys. 94, pp. 6034-6039 (2003).*

(Continued)

*Primary Examiner* — Mark Kaucher
*Assistant Examiner* — Kregg Brooks
(74) *Attorney, Agent, or Firm* — McKee, Voorhees & Sease, PLC

(57) ABSTRACT

Magnetically aligned carbon nanoparticle composites have enhanced electrical properties. The composites comprise carbon nanoparticles, a host material, magnetically sensitive nanoparticles and a surfactant. In addition to enhanced electrical properties, the composites can have enhanced mechanical and thermal properties.

18 Claims, 11 Drawing Sheets

(51) Int. Cl.
C08K 3/04 (2006.01)
H01B 1/04 (2006.01)
C08K 3/22 (2006.01)

(56) References Cited

U.S. PATENT DOCUMENTS

| | | |
|---|---|---|
| 6,833,019 B1 | 12/2004 | Lewis, III et al. |
| 6,858,157 B2 | 2/2005 | Davidson et al. |
| 6,878,184 B1 | 4/2005 | Rockenberger et al. |
| 7,033,416 B2 | 4/2006 | Kurihara et al. |
| 7,078,276 B1 | 7/2006 | Zurcher et al. |
| 7,407,640 B2 | 8/2008 | Barrera et al. |
| 7,744,844 B2 | 6/2010 | Barrera et al. |
| 7,790,560 B2 | 9/2010 | Das |
| 7,803,262 B2 | 9/2010 | Haik et al. |
| 7,829,624 B2 | 11/2010 | Warren |
| 8,075,799 B2 | 12/2011 | Hong et al. |
| 8,246,886 B2 | 8/2012 | Lashmore et al. |
| 8,507,135 B2 | 8/2013 | Grupp |
| 8,816,193 B2 | 8/2014 | Hayashi et al. |
| 2002/0100578 A1 | 8/2002 | Withers et al. |
| 2005/0239948 A1 | 10/2005 | Haik et al. |
| 2006/0202168 A1 | 9/2006 | Barrera et al. |
| 2007/0158610 A1 | 7/2007 | Hong et al. |
| 2008/0063587 A1 | 3/2008 | Strano et al. |
| 2008/0302998 A1 | 12/2008 | Hong et al. |
| 2009/0027069 A1 | 1/2009 | Barrera et al. |
| 2009/0200517 A1 | 8/2009 | El Bounia |
| 2010/0143798 A1 | 6/2010 | Zhamu et al. |
| 2012/0040244 A1 | 2/2012 | Kwon et al. |
| 2012/0045284 A1* | 2/2012 | Kim et al. ............... 405/128.5 |
| 2012/0064409 A1 | 3/2012 | Zhamu et al. |
| 2012/0235080 A1 | 9/2012 | Hong et al. |
| 2013/0065050 A1 | 3/2013 | Chen et al. |
| 2013/0096245 A1 | 4/2013 | Nair et al. |
| 2013/0224452 A1 | 8/2013 | Ramaprabhu et al. |
| 2013/0224603 A1 | 8/2013 | Chen et al. |
| 2013/0309484 A1 | 11/2013 | Sailor et al. |
| 2013/0316179 A1 | 11/2013 | Orikasa |
| 2014/0048738 A1 | 2/2014 | Xia et al. |

FOREIGN PATENT DOCUMENTS

| | | |
|---|---|---|
| CN | 101492159 | 7/2009 |
| CN | 101497535 | 8/2009 |
| CN | 101499341 | 8/2009 |
| CN | 101503579 | 8/2009 |
| CN | 101658933 | 3/2010 |
| CN | 101709436 | 5/2010 |
| CN | 101712452 | 5/2010 |
| CN | 101781757 | 7/2010 |
| CN | 101818280 | 9/2010 |
| CN | 101940910 | 1/2011 |
| CN | 101941842 | 1/2011 |
| KR | 100701627 | 3/2007 |
| KR | 20090092619 | 9/2009 |
| KR | 20110037055 | 4/2011 |
| TW | 201006767 | 2/2010 |
| WO | 2004097853 | 11/2004 |
| WO | 2010131820 | 11/2010 |
| WO | 2012060592 | 5/2012 |
| WO | 2012117349 | 9/2012 |
| WO | 2012118434 | 9/2012 |

OTHER PUBLICATIONS

Prolongo et al., "New alignment procedure of magnetite-CNT hybrid nanofillers on epoxy bulk resin with permanent magnets," Composites: Part B, 46 (2013), 166-172.*
Goh et al., "Directional alignment of carbon nanotubes in polymer matrices: Contemporary approaches and future advances," Composites: Part A, vol. 56, pp. 103-126 (2014).*
Bahrami, M., et al., "Modeling Thermal Contact Resistance: A Scale Analysis Approach", Journal of Heat Transfer, 126: 896-905. Dec. 31, 2004.
Berber, S., et al., "Unusually High Thermal Conductivity of Carbon Nanotubes", Physical Review Letters, 84 (20): 4613-16. Dec. 31, 2000.
Biercuk, M., et al., "Carbon Nanotube Composites for Thermal Management", Applied Physics Letters, 80 (15): 2767-69. Dec. 31, 2002.
Buongiorno, J., et al., "A Benchmark Study on the Thermal Conductivity of Nanofluids", Jounral of Applied Physics, 106 (1094312): 1-14. Dec. 31, 2009.
Choi, S., et al., "Anomalous Thermal Conductivity Enhancement in Nanotube Suspensions", Applied Physics Letters, 79 (14): 2252-54. Dec. 31, 2001.
Dai, H., "Carbon Nanotubes: Opportunities and Challenges", Surface Science, Dept. of Chemistry, Stanford University, Stanford, CA 500: 218-41. Dec. 31, 2002.
Maiti et al., "Polymers as Advanced Materials" Nano Letters, vol. 3, No. 9, Dec. 31, 2003.
Hong, H., et al., "Enhanced Thermal Conductivity by the Magnetic Field in Heat Transfer Nanofluids Containing Carbon Nanotube", Synthetic Metals, 157 (10-12): 437-40. Dec. 31, 2007.
Hong, H., et al., "Heat Transfer Nanofluids Based on Carbon Nanotubes", Journal of Thermophysics and Heat Transfer, 21 (1): 234-9. Dec. 31, 2007.
Horton, M., et al., "Magnetic Alignment of Ni-Coated Single Wall Carbon Nanotubes in Heat Transfer Nanofluids", Journal of Applied Physics, 107 (104320): 1-4. Dec. 31, 2010.
Keblinksi, P., et al., "Nanofluids for Thermal Transport", Materials Today, 8 (6): 36-44. Dec. 31, 2005.
Kim, B., et al., "Effect of Morphology of Carbon Nanotubes on Thermal Conductivity Enhancement of Nanofluids", Journal of Thermophysics and Heat Transfer, 21 (3): 451. Dec. 31, 2007.
Li, C., et al., "Experimental Investigation of Temperature and Volume Fraction Variations on the Effective Thermal Conductivity of Nanoparticle Suspensions (nanofluids)", Journal of Applied Physics, 99: 084314-1 to 084314-8. Dec. 31, 2006.
McCormack, M., et al., "Improved Mechanical Properties in New, Pb-Free Solder Alloys", Jounral of Electronic Materials, 23 (8): 715-20. Dec. 31, 1994.
Philip, J., et al., "Nanofluid with Tunable Thermal Properties", Applied Physics Letters, 92 (043108): 1-3. Dec. 31, 2008.
Ruoff, R., et al., "Mechanical and Thermal Properties of Carbon Nanotubes", Molecular Physics Laboratory, SRI International, Menlo Park, CA, Carbon 33 (7): 925-30. Dec. 31, 1995.
Shima, P.D., et al., "Magnetically Controllable Nanofluid with Tunable Thermal Conductivity and Viscosity", Applied Physics Letters, 95 (133112): 1-3. Dec. 31, 2009.
Wamkam, C., et al., "Effects of pH on Heat Transfer Nanofluids Containing ZrO2 and TiO2 Nanoparticles", Journal of Applied Physics, 109 (024305): 1-5 Dec. 31, 2011.
Wang, X, et al., "Thermal Conductivity of Nanoparticle-Fluid Mixture", Journal of Thermophysics and Heat Transfer, 13 (4) 474-80. Dec. 31, 1990.
Wen, D., et al., "Experimental Investigation Into the Pool Boiling Heat Transfer of Aqueous Based Alumina Nanofluids", Journal of Nanoparticle Research, 7: 265-74. Dec. 31, 2005.
Wensel, J., et al., "Enhanced Thermal Conductivity by Aggregation in Heat Transfer Nanofluids Containing Metal Oxide Nanoparticles and Carbon Nanotubes", Applied Physics Letters, 92 (023110): 1-3. Dec. 31, 2008.
Wright, B., et al., "Magnetic Field Enhanced Thermal Conductivity in Heat Transfer Nanofluids Containing Ni Coated Single Wall Carbon Nanotubes", Applied Physics Letters, 91 (173116): 1-3. Dec. 31, 2007.
Xie, H., et al., "Nanofluids Containing Multiwalled Carbon Nanotubes and Their Enhanced Thermal Conductivities", Journal of Applied Physics, 94 (8): 4967-71. Dec. 31, 2003.
Zhang, Xiefei et al., "Poly(vinyl alcohol)/SWNT Composite Film" NANO Letters, vol. 3, No. 9, pp. 1285-1288, published on Aug. 15, 2003.
Zhu, H., et al., "Effects of Nanoparticle Clustering and Alignment on Thermal Conductivities of Fe3O4 Aqueous Nanofluids", Applied Physics Letters, 89 (023123) 1-3. Dec. 31, 2006.

(56) References Cited

OTHER PUBLICATIONS

International Searching Authority, "Written Opinion" issued in connection with International Application No. PCT/US2011/052007, 7 pages, mailed Feb. 16, 2012.
International Searching Authority, "International Search Report" issued in connection with International Application No. PCT/US2011/052007, 2 pages, mailed Feb. 16, 2012.
Industry-Academic Cooperation, WO 2012/060592 A2—English Translation May 10, 2012.
Univ Donghua—CN 1743387—English Translation Mar. 8, 2006.
Univ Donghua—CN1803858—English Translation Jul. 19, 2006.
Ecology Environment Res CT CAS—CN101492159—English Translation Jul. 29, 2009.
Univ. Guandong Ocean—CN101497535—English Translation Aug. 5, 2009.
Univ Donghua—CN101499341—English Translation Aug. 5, 2009.
Univ Tsinghua—CN101503579—English Translation Aug. 12, 2009.
Univ Anhui Normal—CN101658933—English Translation Mar. 3, 2010.
Univ Hebei Polytechnic—CN101709436—English Translation May 19, 2010.
Univ Harbin Eng—CN101712452—English Translation May 20, 2010.
Harbin Inst. of Technology—CN101781757—English Translation Jul. 21, 2010.
Univ. Shanghai Jiaotong—CN101818280—English Translation Sep. 1, 2010.
Univ. Fuzhou—CN101940910—English Translation Jan. 12, 2011.
Univ Donghua—CN101941842—English Translation Jan. 12, 2011.
Korea Electronics Telecomm—KR20110037055—English Translation Apr. 13, 2011.
Nat. Univ. Tsinghua—TW201006767—English Translation Feb. 16, 2010.

\* cited by examiner

COMPOSITE MATERIALS WITH MAGNETICALLY ALIGNED CARBON NANOPARTICLES HAVING ENHANCED ELECTRICAL PROPERTIES AND METHODS OF PREPARATION

CROSS-REFERENCE TO RELATED APPLICATION

This application is continuation-in-part of U.S. patent application Ser. No. 14/178,948 filed on Feb. 12, 2014, entitled "Composite Materials With Magnetically Aligned Carbon Nanoparticles And Methods Of Preparation". The '948 application is hereby incorporated by reference herein in its entirety.

STATEMENT REGARDING FEDERALLY SPONSORED RESEARCH

This invention was made with government support under Cooperative Agreement W911NF-08-2-022 awarded by the United States Army Research Laboratories and under Award No. NNX09AU83A awarded by the National Aeronautics and Space Administration (NASA) EPSCoR. The government has certain rights in the invention.

FIELD OF THE INVENTION

The present invention relates to polymer composites with enhanced electrical properties. The composites include dispersed carbon nanoparticles. More specifically, the present invention relates to compositions and methods of making carbon nanoparticles magnetically aligned within a composite material for enhanced electrical properties.

BACKGROUND OF THE INVENTION

Nanoparticle composites have broad industrial application, including use in composite materials, polymer composites, materials science, resins, films, coatings films, reinforced polymer composites, transparent electrodes for displays and solar cells, electromagnetic interference shielding, sensors, medical devices and pharmaceutical drug delivery devices, armor, and aeronautical and mechanical materials and surfaces. For example, in the field of semiconductors and electronic devices, nanoparticles, and specifically, conductive nanoparticles of carbon, metals and the like, have been known and enabled to the industry for many years. Examples of US patent disclosures of such particles and processes are provided, by way of non-limiting examples, in U.S. Pat. Nos. 7,078,276; 7,033,416; 6,878,184; 6,833,019; 6,585,796; 6,572,673; 6,372,077. Also, the advantages of having ordered nanoparticles in these applications are well established. (See, for example, U.S. Pat. No. 7,790,560). By way of another example, the combination of nanoparticles and liquid polymers has been found to improve important properties of rubber articles, such as vehicle tires, and in particular, the tread portion of vehicle tires (see U.S. Pat. No. 7,829,624). Furthermore, the physical properties that can potentially be achieved by polymer composites employing nanoparticles include lighter weight materials with improved strength and electrical and thermal properties. These properties can be of great value in many fields. For example, use in body armor, such as helmets and in aeronautics, is of particular importance.

Nanoparticles can be grouped into structures, including nanotubes. Nanoparticles, and in particular, nanotubes have substantial potential for enhancing the strength, elasticity, toughness, electrical conductivity and thermal conductivity of polymer composites, however incorporation of nanoparticles into composites has been difficult. Nanoparticles can include single-walled nanotubes, double-walled nanotubes, and/or multi-walled nanotubes. The use of single-walled carbon nanotubes in polymer composites has been desirable and yet wrought with complications. For example, nanotubes have a tendency to aggregate, which impairs dispersion of the nanotubes. Non-uniform dispersion can present a variety of problems, including reduced and inconsistent tensile strength, elasticity, toughness, electrical conductivity, and thermal conductivity. Generally, preparation of most polymer composites incorporating single-walled carbon nanotubes has been directed at achieving well-dispersed nanotubes in polymers using methods such as mechanical mixing, melt-blending, solvent blending, in-situ polymerization, and combinations of the same. Attempts to create homogenous aqueous dispersions of single-walled carbon nanotubes have been by using certain water-soluble polymers that interact with the nanotubes to give the nanotubes solubility in aqueous systems. See M. J. O'Connell et al., Chem. Phys. Lett. 342 (2001), p. 265. Such systems are described in International Patent Publication, WO 02/016257, published Feb. 28, 2002, and incorporated herein by reference. However, these attempts have not been fully able to provide a dispersion of nanotubes in polymer composites at the desired level of dispersion. This is due in part to multiple factors. For example, nanoparticles, particularly carbon nanotubes and single-walled carbon nanotube, have a tendency to bundle together, which leads to nonuniform dispersion. Another factor is that nanoparticles, in particular nanotubes, often have relatively fragile structures and many of the existing dispersion methods, such as mixing and intense or extended ultrasonication, damage the structure of the nanoparticles. Furthermore, while not wishing to be bound to this theory, it is believed that the geometrical shape of many nanoparticles and intramolecular forces contribute to less uniform dispersion; however, this could alleviated if the nanoparticles were aligned.

Previous attempts have been made to align the nanoparticles and polymers, in particular carbon nanotubes. One of the attempted methods has been the use of magnetic fields. However, it was found that the application of a magnetic field to align polymers and polymer/nanoparticle composites did not work because nanoparticles, in particular carbon nanotubes, do not align on their own in a magnetic field. Other attempts have included the use of nanotubes functionalized with magnetically sensitive groups, including, for example, Ni-coated nanotubes. However, this attempt failed as the functionalized nanotubes were found to have less strength and a decrease in other mechanical properties. This is at least in part due to the fact that once functionalized, the conjugated structure of the nanotubes is broken, which results in changes in surface properties.

U.S. Pat. No. 7,803,262 discusses methods for aligning carbon nanotubes and for making a material comprising these aligned nanotubes. One method discussed involves adsorbing magnetic nanoparticles with carbon nanotubes dispersed in a fluid medium. However, the methods disclosed have several limitations including the attempt to magnetically align nanotubes by adding magnetic particles into a solution. As a result of the method employed, there is poor dispersion, which results in the materials lacking desired properties.

Similarly Chinese Application No. 200510112180 discusses methods for aligning carbon nanotubes and for making a material comprising these aligned nanotubes. However, the methods disclosed have several limitations including, for example, teaching coating the carbon nanotubes with a magnetic material. This method results in less uniform dispersion and poorer mechanical properties than the methods of the present application.

Likewise, Korean Application No. KR20090094306 discloses a method for preparing a carbon nanoparticles-polymer composite by mixing a carbon nanoparticle dispersion with a polymer solution containing magnetic particles to prepare a composite. However, the methods disclosed have several limitations including, for example, teaching addition of the magnetic particles to the polymer solution. This method results in less uniform dispersion and poorer mechanical properties than the methods of the present application.

More recently, in related research, it was found that nanotubes could be magnetically aligned in nanofluids, such as nanogreases and nanolubricants by employing metal oxides in the fluids. See U.S. Pat. No. 8,652,386. However, none of these attempts have brought about the successful magnetic alignment of nanoparticles in polymer composites.

Accordingly, there is a great need for the development of polymer composites with nanoparticles that are more uniformly dispersed and exhibit improved physical properties, such as increased tensile strength, elasticity, toughness, electrical conductivity, and thermal conductivity. Furthermore, there is a need to develop methods of magnetically aligning nanoparticles, in particular carbon nanotubes, in polymer composites.

Thus, an object of the invention is to provide nanoparticle composites with improved dispersion of nanoparticles, preferably in more uniform dispersion.

SUMMARY OF THE INVENTION

The present nanoparticle composites have improved dispersion of nanoparticles, are magnetically aligned, and exhibit enhanced mechanical, thermal and electrical properties, including, but not limited to, tensile strength, elasticity, toughness, stiffness, electrical conductivity, and/or thermal conductivity.

Accordingly, an embodiment of the present nanoparticle composites is a magnetically aligned carbon nanoparticle composite comprising carbon nanoparticles, host material, magnetically sensitive nanoparticles and surfactant and methods of preparing the composite. In an aspect of the present nanoparticle composites, the composites have enhanced mechanical, thermal, and/or electrical properties. In an aspect of the present composites, the carbon nanoparticles comprise at least one of the following: graphene, carbon nanotubes, fullerene, carbon nanotube fiber, or carbon fiber. In another aspect of the present composites, the magnetically sensitive nanoparticles comprise at least one of the following: cobalt, vanadium, manganese, niobium, iron, nickel, copper, silicon, titanium, germanium, zirconium, tin, magnetically sensitive rare earth metals, oxides of the aforementioned metals, and combinations and alloys of the aforementioned metals and/or metal oxides. In a preferred embodiment of the present composites, the magnetically sensitive nanoparticles are selected from the group consisting of NdFeB, Fe, $Fe_2O_3$, $Fe_3O_4$, Ni, NiO, $Ni_2O_3$, Co, CoO, $Co_2O_3$, and $Co_3O_4$, and combinations thereof. In another aspect of the present composites, the surfactant can have a net negative charge when the pH value is more than the pHpzc of magnetically sensitive nanoparticles, or the surfactant can have a net positive charge when the pH value is less than the pHpzc of magnetically sensitive nanoparticles.

A further embodiment of the present composites is found in a method of preparing magnetically aligned carbon nanoparticle composites comprised of combining providing a host material in a liquid state, adding carbon nanoparticles, magnetically sensitive nanoparticles, and surfactant to the liquid host material to form a liquid composite, subjecting the liquid composite to a magnetic field, and solidifying the liquid composite to form the composite. In an aspect of the present composites, the composite prepared by the method can have enhanced mechanical, thermal, and/or electrical properties. In an embodiment of the present composites, the liquid host material can be a resin that can be solidified by curing, or a polymer solution that can be solidified by solvent evaporation, or a molten polymer that can be solidified by cooling, or a monomer or oligomer that can be solidified by in-situ polymerization, and combinations thereof. In another aspect of the present composites, the carbon nanoparticles can comprise at least one of the following: graphene, carbon nanotubes, fullerene, carbon nanotube fiber, or carbon fiber. In a further aspect of the present composites, the magnetically sensitive nanoparticles comprise at least one of the following: cobalt, vanadium, manganese, niobium, iron, nickel, copper, silicon, titanium, germanium, zirconium, tin, magnetically sensitive rare earth metals, oxides of the aforementioned metals, and combinations and alloys of the aforementioned metals and/or metal oxides. In a preferred embodiment of the present composites, the magnetically sensitive nanoparticles are selected from the group consisting of NdFeB, Fe, $Fe_2O_3$, $Fe_3O_4$, Ni, NiO, $Ni_2O_3$, Co, CoO, $Co_2O_3$, and $Co_3O_4$, and combinations thereof. In still another aspect of the present composites the surfactant can have a net negative charge when the pH value is more than the pHpzc of magnetically sensitive nanoparticles, or the surfactant can have a net positive charge when the pH value is less than the pHpzc of magnetically sensitive nanoparticles.

Generally, the present composites relates to compositions of carbon nanoparticles that are magnetically aligned in polymeric, monomeric or oligomeric host liquid—including a solution of the monomer, oligomer or polymer in a solvent—which is then solidified to form nanoparticle composites. The present nanoparticle composites include magnetically sensitive nanoparticles, carbon nanoparticles, host materials, and surfactant(s). The present nanoparticle composites have increased initial modulus (stiffness) and tensile strength along the direction of nanoparticle alignment and can exhibit other desired characteristics such as improved elasticity, thermal conductivity, electrical conductivity, and toughness. Other useful components, such as chemical additives, can be added to the nanoparticle composites as well. The magnetic nanoparticles, carbon nanoparticles, surfactant, and/or other components can be dispersed in a liquid host material solution. Whereas a distinct and important advantage of the present composites is that dispersion and alignment of the carbon nanoparticles does not require surface functionalization or other chemical modification, which frequently degrade mechanical and/or electrical properties, the present composites is nevertheless applicable to carbon-based nanoparticles that can include functional groups on the surface and/or in the bulk of the carbon-based material so long as the functional groups or chemical modifications are not related to enhancing the magnetic susceptibility of the carbon nanoparticles. Thus, in an embodiment of the present composites the carbon nanoparticles do not have any surface functionalization or other chemical modification and are in a pristine state.

Once dispersed in the liquid host material, the liquid is subjected to a magnetic field, which aligns the carbon nanoparticles within the host material, which is subsequently solidified to form a film or other solid or partially solid material. Any suitable means of solidification can be applied, depending on the nature of the polymer, monomer or oligomer liquid, including but not limited to heating, cooling, UV curing and electron-beam curing.

In one aspect, surfactant(s) are attached to the nanoparticles, which are not magnetically sensitive, forming a surfactant and nanoparticle complex ("S/NP Complexes"). The S/NP Complexes are then, in turn attached to the magnetically sensitive nanoparticles. In one embodiment, the attachment occurs prior to dispersion of the surfactant, carbon nanoparticles, and magnetically sensitive particles in a liquid. In another embodiment, the attachment occurs after dispersion of the surfactant(s), carbon nanoparticles, and magnetically sensitive particles in the liquid. In yet another embodiment, the carbon nanoparticles and surfactant(s) are attached to each other by electrostatic attraction.

DETAILED DESCRIPTION OF PREFERRED EMBODIMENT(S)

Definitions

Figure 1:
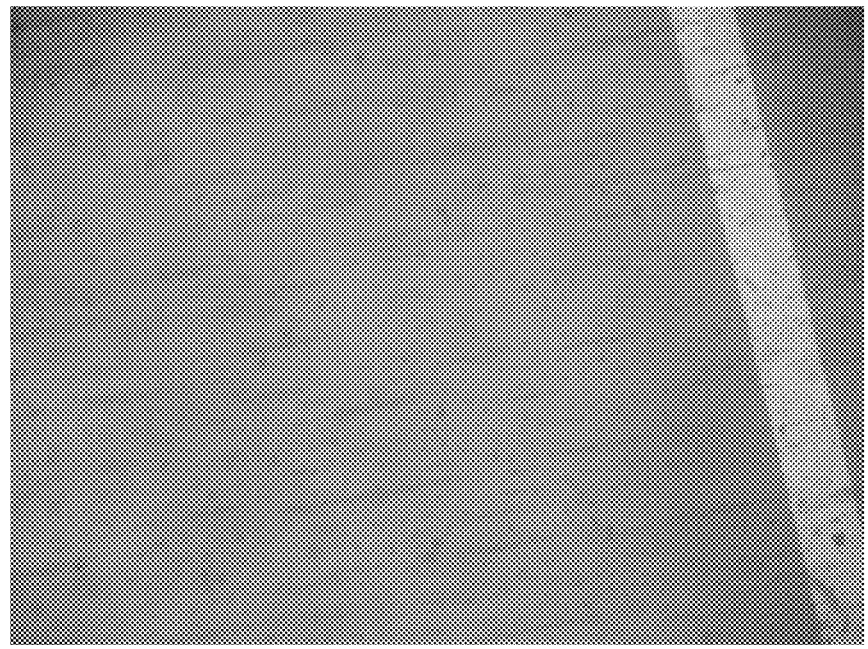
FIG. 1 shows a microscope image of magnetically sensitive single-walled carbon nanotubes in a polyvinyl alcohol solution that are magnetically aligned in a magnetic field strength of 0.185 kG. The reference bar is 30 µm. The solution is made of 0.1 wt. % single-walled carbon nanotubes, 0.1 wt. % NaDDBS, 0.1 wt. % $Fe_2O_3$, and 0.1 polyvinyl alcohol in water.
Figure 2:
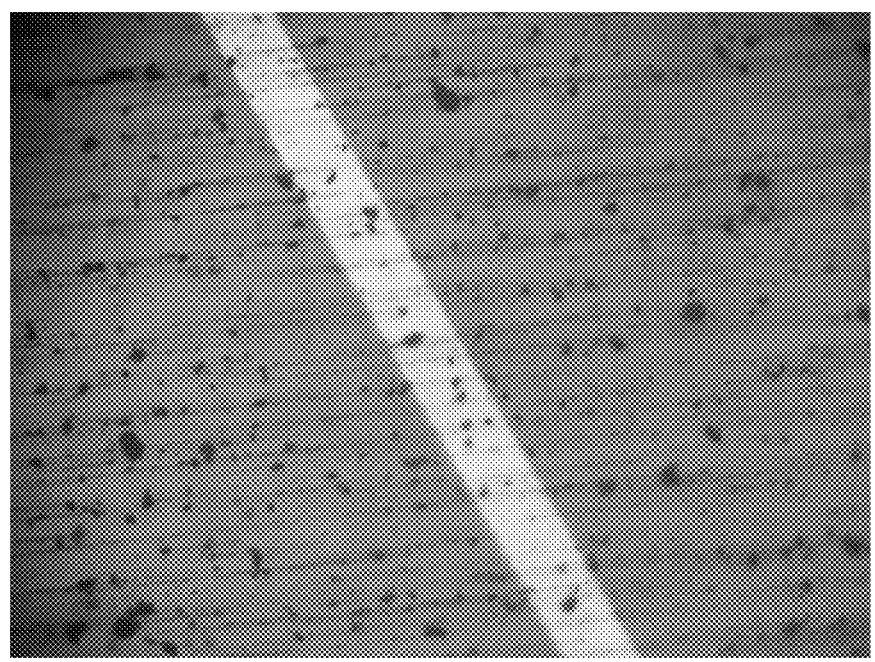
FIG. 2 shows a microscope image of magnetically sensitive single-walled carbon nanotubes in a polyvinyl alcohol.
Figure 3:
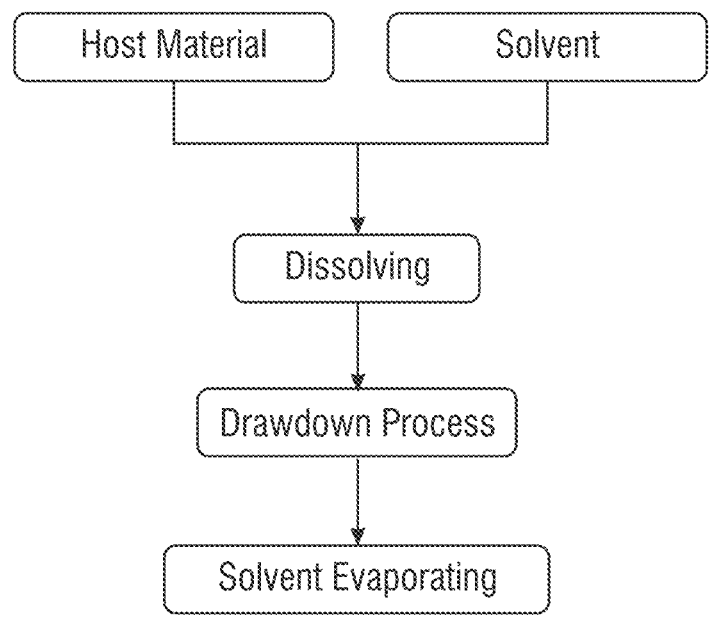
FIG. 3 shows a flowchart for an exemplary method of preparing a neat polymer film where a solvent is employed.
Figure 4:
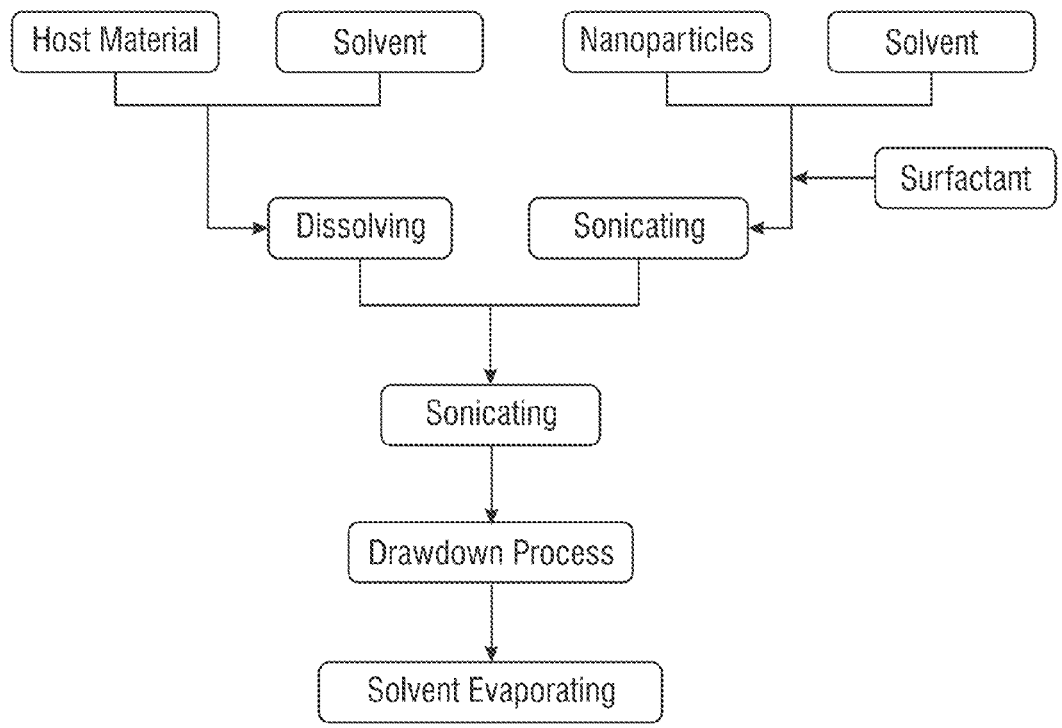
FIG. 4 shows a flowchart for an exemplary method of preparing dispersed nanoparticle composite films using a solvent.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)." The phrases "aligned nanoparticles," "magnetically aligned nanoparticles," and any variation thereof refers to any aligned ordering of nanoparticles. This includes both orientation of rod-like, or any high aspect ratio, structures so that they are aligned, and also alignment of non-tubular-like nanoparticles, including spherical nanoparticles, within a chain-like orientation or otherwise aligned orientation. For example, fullerenes can be aligned in a chain-like alignment.

As used herein, the term "alkyl" or "alkyl groups" refers to saturated hydrocarbons having one or more carbon atoms, including straight-chain alkyl groups (for example, methyl, ethyl, propyl, butyl, pentyl, hexyl, heptyl, octyl, nonyl, decyl, and so on), cyclic alkyl groups (or "cycloalkyl" or "alicyclic" or "carbocyclic" groups) (for example, cyclopropyl, cyclopentyl, cyclohexyl, cycloheptyl, cyclooctyl, and so on), branched-chain alkyl groups (for example, isopropyl, tert-butyl, sec-butyl, isobutyl, and so on), and alkyl-substituted alkyl groups (for example, alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents can include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "carbon nanoparticle" and any variations thereof refer to nanoparticles that are primarily composed of carbon atoms, including diamond, graphite, graphene, fullerenes, carbon nanotubes, carbon nanotube fiber (also referred to as carbon nanotube yarn), carbon fibers, and combinations thereof, which are not magnetically sensitive. The terms are inclusive of structural variations and modification of carbon nanotubes, including single wall carbon nanotubes, double wall carbon nanotubes, and multi wall carbon nanotubes, including configurations, structural defects and variations, tube arrangements, chemical modification and functionalization, surface treatment, and encapsulation.

The term "dipole moment" or "electrical dipole moment" refers to a measure of the separation of positive and negative electrical charges in a system of charges, that is, a measure of the charge system's overall polarity (with, for example, SI units of Coulomb-meter (Cm)).

The term "magnetic field" refers to a field of force associated with changing electric fields, as when electric charges are in motion. Magnetic fields exert deflective forces on moving electric charges.

The term "magnetically sensitive" or "magnetic-field-sensitive" refers to the characteristic of responding orientationally to the presence of an electric or a magnetic field. The terms "magnetically sensitive" and "magnetic-field-sensitive" are used interchangeably for the present composites.

The abbreviation "MSP" refers to the magnetically sensitive nanoparticles discussed more extensively herein.

The term "nanoparticle" includes, for example, "nanospheres," "nanorods," "nanocups," "nanowires," "nanoclusters," "nanofibers," "nanolayers," "nanotubes," "nanocrystals," "nanobeads," "nanobelts," and "nanodisks."

As used herein, the term "nanotube" refers to cylindrical structures formed by nanoparticles. In a preferred embodiment, nanotubes are formed by carbon-based nanoparticles. In one embodiment, the nanotubes are single-walled nanotubes ("SWNT"), double-walled nanotubes ("DWNT"), multi-walled nanotubes ("MWNT"), or a combination of the same. In a preferred embodiment, the nanotubes include SWNT, MWNT, and/or DWNT. As used herein, the term MWNT is inclusive of DWNTs. When the nanotube is carbon-based the abbreviation is modified by a "C-," for example, C-SWNT and C-MWNT.

As used herein, the terms "neat polymer," "neat polymer film," and variations thereof, refer to polymers with distinct characteristics to suit specific applications. These distinct characteristics are derived from the chemical structure of monomeric units and arrangement of polymeric chains.

The term "nonmagnetically sensitive" or "nonmagnetic-field-sensitive" refers to the characteristic of not responding (or responding weakly) orientationally to the presence of an electric or a magnetic field. The terms "nonmagnetically sensitive" and "nonmagnetic-field-sensitive" are used interchangeably for the present composites.

The terms "composite," "nanoparticle composite," "nanoparticle/polymer composite," "nanoparticle/host material composite" and any variations thereof refer to the composite formed with the carbon nanoparticles, host materials, surfactants, and magnetically sensitive particles. At times they may refer to the aforementioned components in a liquid state prior to solidifying; in some embodiments this can include solvent that has yet to be evaporated; such use will be clear at the time it is discussed and is intended to be understood as the liquid precursor to a solidified nanoparticle composite.

The term "polyol ester" refers to an ester of an organic compound containing at least two hydroxyls with at least one carboxylic acid.

The term "surfactant" refers to a molecule having surface activity, including wetting agents, dispersants, emulsifiers, detergents, and foaming agents, and the like. It is understood to be inclusive of the use of a single surfactant or multiple surfactants.

The terms "ultrasonication" and "sonication" are synonymous and used interchangeably herein.

The term "weight percent," "wt. %," "wt-%," "percent by weight," "% by weight," and variations thereof, as used herein, refer to the concentration of a substance as the weight of that substance divided by the total weight of the composition and multiplied by 100.

Compositions

Although not wishing to be bound by any particular scientific theory, it is believed aligned nanoparticle composites, especially aligned carbon nanotubes, provide various benefits over other composites, including nanoparticle/polymer composites and well-dispersed nanoparticle/polymer composites. This is because the alignment of nanoparticles in composites improves the flow of ions or electrons and provides a more ordered structure or a more anisotropic structure which enhances properties, including mechanical properties, in the direction of alignment, and sometimes enhances properties perpendicular to the direction of alignment as well. This results in improved structural properties of the composite as a whole and thus improved physical properties, including, but not limited to, increased tensile modulus (stiffness), flexural modulus, tensile strength, flexural strength, elasticity, toughness, electrical conductivity, and thermal conductivity. Moreover, with particular respect to the host materials, the alignment is believed to prevent or at least diminish the aggregation of the nanoparticles and lead to enhanced host material characteristics. These enhanced host material characteristics include reductions in scission and degradation, improved conductivity (for example, electrical, energy and heat), enhanced chemical properties (through more ordered spatial orientation that results in more consistent intramolecular forces and dipole interaction), physical properties (for example, a more ordered spatial arrangement and preferred orientation imparts increased structural stiffness and strength). As for heat transfer applications, this alignment is believed to provide enhanced thermal conductivity properties.

The nanoparticles of the present composites can be any conventional nanoparticle used in polymers and polymer composites. The nanoparticles can be selected based upon their stability, solubility, thermophysical, electrical, mechanical, size, and zeta potential (for example, surface charge) properties. The magnetically sensitive nanoparticles include material which responds orientationally to the presence of an electric or a magnetic field, such as magnetically sensitive metals and metal oxides.

In an aspect of the present composites, the nanoparticle/host material mixtures in solvent can have combinations of specific pH ranges. In one embodiment, if the surfactant(s) have a net negative charge, the pH of the nanoparticle/host material mixture in solvent is greater than about 5. In another embodiment, if the surfactant(s) have a net positive charge, the pH of the nanoparticle/host material mixture in solvent is less than about 10.

In yet another aspect, it was found that the nanoparticle/host material mixture in solvent of the present composites having higher dipole moments result in more rapid alignment. Therefore, in one embodiment, the nanoparticle/host material mixture in solvent have a dipole moment at least or greater than about zero (0), at least or greater than about 1, at least or greater than about two 2, or at least or greater than about 3.

Carbon Nanoparticles

Carbon nanoparticles are included in the compositions of the present composites. The carbon nanoparticles are generally not magnetically sensitive. Carbon nanoparticles are inclusive of any nanoparticle, including submicron nanofibers. Suitable carbon nanoparticles include graphene, fullerene, nanotubes, nanofibers. Nanotubes are macromolecules in the shape of a long thin cylinder often with a diameter in the range 1 nanometer to a few nanometers. Nanotubes, in particular CNTs, have a high heat transfer coefficient and high thermal conductivity, which often exceed these of the best metallic material. For example, it has been reported that C-SWNTs can exhibit a thermal conductivity value as high as 2000-6000 W/m-K under ideal circumstances. Many forms of CNTs can be used in the present composites, including C-SWNTs, C-MWNTs, hollow carbon nanofibers, and combinations thereof.

In many nanotubes, particularly CNTs, the basic structural element is a hexagon, which is the same as that found in graphite. Based on the orientation of the tube axis with respect to the hexagonal lattice, a nanotube can have three different configurations: armchair, zigzag, and chiral (also known as spiral). In a carbon-based nanotube in an armchair configuration, the tube axis is perpendicular to two of six carbon-carbon bonds of the hexagonal lattice. In a carbon-based nanotube in a zigzag configuration, the tube axis is parallel to two of six carbon-carbon bonds of the hexagonal lattice. Both these two configurations are achiral. In a carbon-based nanotube in a chiral configuration, the tube axis forms an angle other than 90 or 180 degrees with any of six carbon-carbon bonds of the hexagonal lattice. Nanotubes of these configurations often exhibit different physical and chemical properties. For example, an armchair nanotube is metallic, whereas a zigzag nanotube can be metallic or semi-conductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of nanotube molecules can also contain other size rings, such as pentagon, heptagon, and octagon. Replacement of some regular hexagons with other ring structures, such as pentagons and/or heptagons, can cause cylinders to bend, twist, or change diameter, and thus lead to some interesting structures such as "Y-," "T-," and "X-junctions," and different chemical activities. Those various structural variations and configurations can be found in both SWNT and MWNT.

However, the present composites are not limited by any particular configuration and structural variation. The nanotubes used in the present composites can be in the configuration of armchair, zigzag, chiral, or combinations thereof. The nanotubes can also contain structural elements other than hexagon, such as pentagon, heptagon, octagon, or combinations thereof.

Another structural variation for MWNT molecules is the arrangement of multiple nanotubes. An exemplary C-MWNT is like a stack of graphene sheets rolled up into concentric cylinders with each wall parallel to the central axis. However, the tubes can also be arranged so that an angle between the graphite basal planes and the tube axis is formed. Such MWNT, whether carbon-based or not, is known as a stacked cone, chevron, bamboo, ice cream cone, or piled cone structures. A stacked cone MWNT can reach a diameter of about 100 µm. In spite of these structural variations, MWNTs are suitable for the present composites.

Nanotubes used in the present composites can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Such molecules include alloys of these elements such as alloys of Cobalt with S, Br, Ph, Pt, Y, Cu, B, and Mg, and compounds such as the carbides (for example, TiC and MoC). The presence of these elements, alloys and compounds within the core structure of the nanotubes can enhance the various properties, such as thermal or electrical conductivity. It is believed that nanotubes encapsulating Cu and Ag exhibit particularly favorable electrical conductivity.

In an embodiment of the present composites, the nanotubes are CNTs. CNTs can be C-SWNTs or C-MWNTs. CNTs can also be chemically modified, functionalized, and surface treated to modify their properties. However, any such modification, functionalization, and/or surface treatment tend to injure the mechanical, thermal, and/or electrical properties of the nanotube. For example, attempts to functionalize CNTs to be magnetically sensitive have actually injured the properties of the CNTs because, for example, the functionalization alters the nanotube surface structure and hinders the ability to properly align. Thus, compositions of the present composites are preferably substantially free of CNTs that have been functionalized or chemically modified to contain magnetically sensitive groups, and are preferably substantially free of CNTs in which functionalization or chemical modification has reduced the intrinsic mechanical strength or stiffness of the pristine carbon nanotube, or has reduced the intrinsic electrical or thermal conductivity of the pristine carbon nanotube.

Nanotubes are commercially available from a variety of sources. Single-walled nanotubes can be obtained from Carbolex (Broomall, Pa.), MER Corporation (Tucson, Ariz.), and Carbon Nanotechnologies Incorporation ("CNI", Houston, Tex.). Multi-walled nanotubes can be obtained from MER Corporation (Tucson, Ariz.) and Helix material solution (Richardson, Tex.). However, the present composites are not limited by the source of nanotubes. In addition, many publications are available with sufficient information to allow one to manufacture nanotubes with desired structures and properties. The most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon-containing gas, such as acetylene, ethylene and ethanol, with a metal catalyst particle, such as cobalt, nickel, or ion, at temperatures above 600° C.

The selection of a particular nanotube depends on a number of factors. The most important factor is the compatibility of the nanoparticle with the desired polymer. Other factors include desired physical properties, such as electrical and thermal conductivity, mass, and tensile strength; cost effectiveness; solubility; and dispersion and settling characteristics. In one embodiment of the present composites, the nanotubes selected include CNTs. In another embodiment of the present composites, the nanotubes contain at least 50%, at least 60%, at least 70%, at least 80%, at least 90%, or at least 95% CNTs by weight of the nanotubes. In another aspect of the present composites, the nanotube selected include SWNTs. In a further aspect of the present composites, the nanotubes include multi-walled nanotubes. In yet another embodiment, the nanotubes include CNTs that are functionalized chemically.

In another embodiment of the present composites, the carbon nanoparticles are single, bilayer or multilayer graphene.

In yet another embodiment of the present composites, the carbon nanoparticles can be single, bilayer or multilayer graphene oxide.

In the present compositions and methods, the carbon nanoparticles are added to the compositions as a weight percentage of the composition. In an embodiment of the present composites the carbon nanoparticles are added in an amount between about 0.01 wt. % and 20 wt. % of the composition. In a preferred embodiment, the nanoparticles are added in an amount between about 0.1 wt. % and 15 wt. % of the composition. In a more preferred embodiment, the nanoparticles are added in an amount between about 1 wt. % and 10 wt. % of the composition. In an even more preferred embodiment the nanoparticles are added in an amount between about 2 wt. % and 8 wt. % of the composition.

Magnetically Sensitive Nanoparticles

In an embodiment of the present composites, the compositions employ magnetically sensitive nanoparticles ("MSPs"). The MSPs can include magnetically sensitive rare earth metals, metals, and metal oxides and can be paramagnetic, superparamagnetic or ferromagnetic. In particular, the MSPs include, but are not limited to, nanoparticles of cobalt, vanadium, manganese, niobium, iron, nickel, copper, silicon, titanium, germanium, zirconium, tin, rare earth metals such as neodymium, praseodymium, samarium, gadolinium, dysprosium, holmium, and yttrium, oxides of the aforementioned metals, and combinations and alloys of the aforementioned metals and/or metal oxides. Preferred MSPs include, NdFeB, Fe, $Fe_2O_3$, $Fe_3O_4$, Ni, NiO, $Ni_2O_3$, Co, CoO, $CO_2O_3$, and $CO_3O_4$. In a particularly preferred embodiment, the MSP includes $Fe_2O_3$.

In an embodiment, two or more nanoparticles are attached to each other. In one preferred embodiment, carbon nanoparticles, such as CNTs, are attached to MSPs. Any conventional method can be used to attach the nanoparticles to each other. However, it has been observed that carbon nanoparticles and iron oxide ($Fe_2O_3$) dispersed together in a deionized water/ethylene glycol solution to form a nanofluid and then, exposed to a magnetic field do not result in any increased thermal conductivity for a nanofluid. While not wishing to be bound by any scientific theory, it is believed that metal or metal oxide detaches from the nanoparticle under a strong magnetic field or that the amount of metal or metal oxide that was attached to the nanoparticle was too trivial. Therefore, a preferred embodiment is to use a method that can create a binding force that can withstand the shear forces of a strong magnetic field, such as electrostatic attraction, to attach the nanoparticles to each other. In this regard, selecting a surfactant to "match" the charge of the magnetically charged nanoparticle is important for attaching the nonmagnetically charged nanoparticles to the magnetically charged nanoparticles. For example, if the magnetically sensitive nanoparticle has a positive charge, a surfactant with a net negative charge should be selected so as to aid in the connecting the nanoparticle, via the S/NP Complex, to the MSP (and enhance the electrostatic attraction between the nanoparticles). This is discussed more extensively under the surfactant section.

In the present compositions and methods, the MSPs are added to the compositions as a weight percentage of the composition. In an embodiment of the present composites the MSPs are added in an amount between about 0.01 wt. % and 15 wt. % of the composition. In a preferred embodiment the MSPs are added in an amount between about 0.1 wt. % and 10 wt. % of the composition. In a more preferred embodiment the MSPs are added in an amount between about 1 wt. % and 8 wt. % of the composition. In an even more preferred embodiment the nanoparticles are added in an amount between about 2 wt. % and 6 wt. % of the composition.

Surfactant

The present compositions and methods can include one or more surfactants. In some embodiments of the present composites, the surfactant is selected based on its net charge and chosen to "match" the charge of the magnetically sensitive nanoparticles. By way of example, in one embodiment, if the magnetically sensitive nanoparticle has a positive charge, a surfactant with a net negative charge should be selected. In another embodiment, if the magnetically sensitive nanoparticle has a negative charge, a surfactant with a net positive charge should be selected. While not wishing to be bound by the theory, it is believed that the ionic surfactants charge the nanoparticles such that the MSP is attracted to the nanoparticle, thereby making the nanoparticle magnetically sensitive. Moreover, the surfactants can serve to disperse the nanoparticles.

Accordingly, in particular embodiments of the present composites, the composition is substantially free of nonionic surfactants. For example, in an embodiment of the present composites, the compositions can have nonionic surfactants in an amount less than about 0.5 wt-%, preferably less than about 0.1 wt-%, more preferably less than about 0.01 wt-%, even more preferably the compositions contains no nonionic surfactant.

The pH of the surfactant can also be a factor to be considered when selecting surfactant. Therefore, in an embodiment, the surfactant(s) of the present composites have an appropriate pH that maintains, imparts (or helps to impart) or results in a desired charge effect or net charge, whether positive or negative. In addition, by providing a composition having an appropriate pH, a charge effect between the surfactant molecules and the MSPs can be maintained. The nanoparticles can then be maintained in suspension due to the charge effect between the head groups on the surfactant molecules. Therefore, in another aspect, the composites of the present composites have combinations of specific pH ranges and surfactant(s). In an embodiment of the present composites, the surfactant can have a net negative charge and the pH of the composition is greater than about 5. In another embodiment, the surfactant has a net positive charge and the pH of the composition is less than about 10 In one embodiment, if the surfactant(s) have a net negative charge the pH of the fluid is greater than about 5. In another embodiment, if the surfactant(s) have a net positive charge, the pH of the fluid is less than about 9. As an alternative embodiment, the pH of the compositions can be adjusted below the pH point of zero charge, or "pHpzc" at which pH the magnetically sensitive nanoparticle's surface is neutral. In another embodiment, the surfactants are anionic or with a negative net charge. In a preferred embodiment the anionic surfactant comprises sodium dodecylbenzene sulfonate (NaDDBS). In another embodiment, the surfactants are cationic or with a positive net charge. In a preferred embodiment, the cationic surfactants of the present composites are cetyl trimethylammonium bromide (CTAB). CTAB is also known as hexadecyl trimethyl ammonium bromide.

A variety of surfactants can be used in the present composites as a dispersant to facilitate uniform dispersion of nanoparticles and to enhance stabilization of such dispersion as well. Typically, the surfactants used in the present composites contain a lipophilic hydrocarbon group and a polar functional hydrophilic group. The polar functional group can be of the class of carboxylate, ester, amine, amide, imide, hydroxyl, ether, nitrile, phosphate, sulfate, or sulfonate. The surfactant can be anionic, cationic, zwitterionic, amphoteric and ampholytic.

In one embodiment, the surfactant is anionic, including sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate.

Specific examples of sulfates include sodium dodecyl sulfate, sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, for example, 2, 3, or 4 units, of ethylene oxide, per each alkyl group. Non-limiting, illustrative examples of alky and aryl sulfonates are sodium tridecyl benzene sulfonate and sodium dodecylbenzene sulfonate (NaDDBS). In a preferred embodiment, the surfactant includes NaDDBS.

Non-limiting, illustrative examples of sulfosuccinates include, but not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates. The structures of silicone copolyol sulfosuccinates are set forth in U.S. Pat. Nos. 4,717,498 and 4,849,127.

Illustrative examples of sulfosuccinamates include, but not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIP A-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec Inc., West Paterson, N.J.), NaSul CA-HT3 (King industries, Norwalk, Conn.), and C500 (Crompton Co, West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

For an anionic surfactant, the counter ion is typically sodium but can alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations can also be used.

In another embodiment, the surfactant is cationic, including primarily organic amines, primary, secondary, tertiary or quaternary. For a cationic surfactant, the counter ion can be chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide ("CTAB"), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate. In a preferred embodiment, the surfactant includes CTAB.

Examples of quaternary amines with two long alkyl groups are distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bisstearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, can also be used.

In yet another embodiment, the surfactant is zwitterionic, which has both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety can contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

In yet another embodiment, the surfactant is amphoteric. Suitable examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

In yet another embodiment, the surfactant is a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, and polystearamides.

In yet another embodiment, the surfactant is an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

In yet another embodiment, the surfactant used in the present composites is a combination of two or more selected from the group consisting of anionic, cationic, zwitterionic, amphoteric, and ampholytic surfactants. Suitable examples of a combination of two or more surfactants of the same type include, but not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of the different types include, but not limited to, a mixture of one anionic and one cationic surfactant, a mixture of one anionic and one zwitterionic surfactant, a mixture of one anionic and one amphoteric surfactant, a mixture of one anionic and one ampholytic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, for example, a mixture of two anionic surfactants, is also included in the present composites.

In one aspect, the present composites include at least one surfactant. In an embodiment of the present composites, the surfactant includes at least one anionic surfactant. In a preferred embodiment, the present composites include an anionic surfactant. In a more preferred embodiment of the present composites, the compositions include NaDDBS.

In another aspect of the present compositions and methods, the surfactant is added as a weight percentage of the composition. In an embodiment of the present composites the surfactant is added in an amount between about 0.01 wt. % and 40 wt. % of the composition. In a preferred embodiment the nanoparticles are added in an amount between about 0.1 wt. % and 30 wt. % of the composition. In a more preferred embodiment the nanoparticles are added in an amount between about 1 wt. % and 25 wt. % of the composition. In an even more preferred embodiment the nanoparticles are added in an amount between about 5 wt. % and 20 wt. % of the polymer.

Host Material

The present composites includes a host material. Host materials are selected based on the intended use and desired properties of the composite. Suitable host materials can include, but are not limited to, metals, ceramics, semiconductors, sol-gels, alloys, metalloids, polymers, oils, waxes, polymerizable monomers, solvents, solutions, suspensions, emulsions, and combinations thereof. U.S. Pat. No. 7,306,828 describes methods of incorporating nanoparticles in ceramic hosts. Polymeric host materials, as described herein, include, but are not limited to, thermoplastics, thermosets, polymer blends, elastomers, fibers (including, but not limited to fibers that are subsequently used to create weaves, rovings, tows, mats, and combinations thereof), resins, silicones, fluorinated polymers, and combinations thereof. In some embodiments, the polymeric host materials comprise additives, which include, but are not limited to, plasticizers, curing agents, catalysts, diluents, reactive diluents, toughening agents, pigments, optical brighteners, UV absorbers and/or reflectors, infrared absorbers and/or reflectors, and combinations thereof. In some embodiments, such as those utilizing a host material which is an epoxy or other thermoset or chemically crosslinkable polymer, the carbon nanoparticle and magnetically sensitive nanoparticle components are added prior to any curing events for the host material. Examples of particularly suitable host materials include, but are not limited to, thermoplastic polymers, thermoset polymers, monomers and/or oligomers that are capable of polymerizing, low molecular weight polymers which are capable of chemical crosslinking, elastomers, silicones, epoxies, and ceramics.

The host material can be provided in a liquid state. Examples of suitable liquid states for the host material include providing it as a resin that can be solidified by curing, as a polymer solution that can be solidified by solvent evaporation, as a molten polymer that can be solidified by cooling, or as a monomer or oligomer that can be solidified by in-situ polymerization, and combinations thereof.

The host material can include a polymer. The term polymer is inclusive of polymers, copolymers, polymer blends and polymers in salt form. In an embodiment of the present composites, the polymer is water-soluble. However, it is anticipated that hydrophobic polymers can also be used in embodiments of the present composites. The polymer can be in liquid or powdered form. In one embodiment of the present composites, a polymer matrix is formed from a polymer in the form of polymer particles suspended in an aqueous system, such as a polymer emulsion or latex. The polymer particles are preferably able to coalesce as moisture is removed from the aqueous suspension.

Polymers as described herein, can include, but are not limited to, thermoplastics, thermosets, elastomers, polymer fibers (including, but not limited to fibers that are made into weaves, rovings, tows, mats, and combinations thereof), silicones, fluorinated polymers, and combinations thereof. In some embodiments, the polymers can comprise additives, which include, but are not limited to, plasticizers, curing agents, catalysts, and combinations thereof. In some embodiments, the polymers can be generated (namely, polymerized from monomeric precursors) within, or in the midst of, the dispersion of nanoparticles, MSPs, and/or surfactants. In some embodiments the nanoparticles, MSPs, and/or surfactants, are dispersed in a solution comprising polymers or polymeric precursors.

Suitable water-soluble polymers are polymers that form polymer solutions or aqueous suspensions in water. The water solubility of a particular polymer depends on a number of factors, including, but not limited to, polymer composition, polymer molecular weight, the critical concentration of the polymer, temperature and pressure. The critical concentration of the polymer is the highest concentration where polymer coils can still reach their maximum extension in volume. In an embodiment, preferred water-soluble polymers are those that can form true solutions in water, rather than suspensions of polymer particulates. However, in another embodiment preferred polymers are those that form suspensions of polymer particulates.

Suitable water-soluble polymers for the compositions of the present composites, include, but are not limited to, amphiphilic polymers, also called polymer surfactants, which contain both hydrophobic and hydrophilic segments, some cellulosic polymers, polyacrylic esters, polyacrylonitriles, polyacrylamides, polyelectrolytes, ionic polymers, acrylate polymers, acrylic acid polymers, chlorinated polymers, fluorinated polymers, styrenic polymers, polyurethanes, natural rubber polymers, synthetic rubber polymers, vinylchloride-acrylate polymers, and copolymers and terpolymers of the aforementioned.

Suitable specific water-soluble polymers include, but are not limited to, Gum Arabic, polyvinyl pyrrolidone, polyvinyl alcohol (PVA), polyacrylic acid, polyvinyl acetate, polymethacrylic acid, sodium polyacrylate, polyethylene oxide, polyethylene glycol, polyethylene formamide, polyacrylamide, polyacrylonitrile, polyvinylpropionate, polystyrene, polyvinyl chloride, polyvinylidene chloride, polyvinyl chloride-ethylene, polyvinyl chloride-propylene), polystyrene-co-butadiene, polyhydroxyether, polyvinyl oxazolidinone, methyl cellulose, ethyl cellulose, carboxymethyl cellulose, ethyl(hydroxyethyl)cellulose, sodium polyacrylate, copolymers thereof, and combinations thereof. Other suitable water-soluble polymers for stabilizing aqueous nanoparticle suspensions include, but are not limited to, polystyrene sulfonate, poly(l-vinyl pyrrolidone-co-vinyl acetate), poly(l-vinyl pyrrolidone-co-acrylic acid), poly(l-vinyl pyrrolidone-co-dimethylaminoethyl methacrylate), polyvinyl sulfate, poly(sodium styrene sulfonic acid-co-maleic acid), dextran, dextran sulfate, gelatin, bovine serumalbumin, poly(methyl methacrylate-co-ethyl acrylate), polyallyl amine, and combinations thereof. In an embodiment of the present composites, polyvinyl alcohol is the preferred polymer.

Suitable thermoplastic polymers include, but are not limited to, anionic polyamide-6, cyclic polybutylene terephthalate c-PBT, polyethylene terephthalate, nylon, polytetrafluoroethylene (Teflon), polystyrenes, polymethyl (methacrylate)s, polyethylenes, polypropylenes, polystyrenes, and polyvinyl chlorides. In an aspect of the present composites, preferable thermoplastics have low viscosities. In a particular embodiment, preferable thermoplastics include anionic polyamide-6 or c-PBT.

Suitable thermosetting host materials include epoxies, polyvinyl esters, polyimides, thermosetting polyurethanes, phenolics, unsaturated polyesters, polyurea, silicone, bis-maleimides.

In embodiments of the present composites, the host material can be provided in molten form. The amount of host material added will depend on the particular application and amount of composite desired. In an aspect of the present composites, the host material comprises at least about 40 wt. % of the composition, preferably at least about 45 wt. % of the composition, more preferably at least about 60 wt. % of the composition, and even more preferably at least about 75 wt. % of the composition. In another aspect of the present composites the host material is between about 40 wt. % and about 99.9 wt. % of the composition, preferably between about 45 wt. % and about 95 wt. % of the composition, more preferably between about 55 wt. % and about 90 wt. % of the composition, and even more preferably between about 70 wt. % and about 85 wt. % of the composition.

Optional Ingredients

The compositions of the present composites can also contain one or more other optional ingredients to provide other desired chemical and physical properties and characteristics. In addition to the chemicals discussed separately below, many other known types of optional ingredients such as dyes and air release agents, can also be included in the compositions produced and/or used in the practice of the present composites. In general, the optional ingredients are employed in the compositions in minor amounts sufficient to enhance the performance characteristics and properties of the composition. The amounts will thus vary in accordance with the desired compositions intended use and properties.

Suitable chemical optional ingredients include, but are not limited to, adhesion promoters, antioxidants, buffering agents, corrosion inhibitors, defoamers, dyes, pigments, fluids, friction modifiers, host materials, pour point depressants, scale inhibitors, seal-swelling agents, solvents, stabilizer, thickening agents, diluents, viscosity improvers, and viscosity reducers In addition to the chemicals listed, many other known types of additives such as dyes, foam inhibitors, demulsifiers, and air release agents, can also be included in finished compositions produced and/or used in the practice of the present composites.

Adhesion and Hardening Promoters

The present composites can include adhesion and hardening promoters. Adhesion and hardening promoters increase hardness and adhesion to substrates, such as glass, silicon wafer, amorphous silicon and plastics. Suitable adhesion promoters include metal complexes of Pd, Mg, W, Ni, Cr, Bi, B, Sn, In, and Pt.

Antioxidants

The compositions of the present composites can include antioxidants. Suitable antioxidants include phenolic antioxidants, aromatic amine antioxidants, sulfurized phenolic antioxidants, and organic phosphates. Examples include 2,6-di-tert-butylphenol, liquid mixtures of tertiary butylated phenols, 2,6-di-tertbutyl-4-methylphenol, 4,4'-methylenebis (2,6-di-butyl phenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenylamine, phenyl-alpha-naphthylamine, and phenyl-betanaphthylamine.

Buffering Agent

The compositions of the present composites can include buffering agents. The buffering agents can be selected from known or commonly used buffering agents. The selected buffering agents can exhibit both anti-corrosion and buffering properties. In certain formulations, for example, benzoates, borates, and phosphates can provide both buffering and anti-corrosion advantages. In addition, a base can be used to adjust the pH value of the composition. Illustrative examples of bases for use with the present composites include commonly known and used bases, for example, inorganic bases such as KOH, NaOH, NaHCO$_3$, K$_2$CO$_3$, and Na$_2$CO$_3$. In addition, an acid can be used to adjust the pH value of the composition. Illustrative examples of acids for use in the present composites include commonly known and used acids, for example, organic acids including, but not limited to, α-hydroxy acids, such as malic acid, citric acid, lactic acid, glycolic acid, and mixtures thereof, and inorganic acids, including but not limited to mineral acids such as boric acid, hydrobromic acid, hydrochloric acid, hydrofluoric acid, nitric acid, perchloric acid, phosphoric acid, and sulfuric acid. In an embodiment of the present composites, the pH will be between about 4 and about 11, preferably between about 5 and about 10. In another embodiment of the present composites, the pH will between about 5 and about 7 or between about 7 and about 10.

Corrosion Inhibitors

The compositions of the present composites can include a corrosion inhibitor. The corrosion inhibitors can be either an organic additive or an inorganic additive. Suitable organic corrosion inhibitors include short aliphatic dicarboxylic acids such as maleic acid; succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles, sulfonates; and imidazolines. Examples of suitable organic corrosion inhibitors include dimer and trimer acids, such as those produced from tall oil fatty acids, oleic acid, or linoleic acid; alkenyl succinic acid and alkenyl succinic anhydride corrosion inhibitors, such as tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride; and the half esters of alkenyl succinic acids having 8 to 24 carbon atoms in the alkenyl group with alcohols such as the polyglycols. Other suitable corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof. Suitable inorganic additives include borates, phosphates, silicates, nitrates, nitrites, and molybdates.

Copper Corrosion Inhibitors

Suitable copper corrosion inhibitors include thiazoles such as 2-mercapto benzothiazole, triazoles such as benzotriazole, tolyltriazole, octyltriazole, decyltriazole, and dodecyltriazole; and thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Defoamers

The compositions of the present composites can include buffering agents. Suitable defoamers include components such as silicon defoamers, alcohols such as polyethoxylated glycol, polypropoxylated glycol or acetylenic glycols.

Diluents

Embodiments of the present composites can include diluents. Exemplary diluents include, mono- and di-glycidyl ethers, glycol ether, glycol ether esters and glycol ether ketones, and combinations thereof. Preferred diluents include mono- and di-glycidyl ethers. Diluents are not limited to any of these agents and suitable diluents can be selected based on the desired host material.

Fluids

Embodiments of the present composites can include a fluid, which can be either hydrophilic or hydrophobic. The fluid can be any conventional fluid used in polymer and thermal transfer applications. For example, a hydrophilic fluid is commonly used in coolants whereas a hydrophobic fluid is commonly used in a lubricant or grease.

The fluid can be a single component or multi-component mixture. For example, a hydrophilic fluid can contain water, ethylene glycol, and diethylene glycol in various proportions. The hydrophilic fluid can contain about 0.1 to about 99.9% by volume of water, about 0.1 to about 99.9% by volume of ethylene glycol, and about 0.1 to about 99.9% by volume of diethylene glycol; and about 20 to about 80%, about 40 to about 60%, or about 50% by volume of water or ethylene glycol. Typically, diethylene glycol constitutes a minor component of the hydrophilic fluid, in no greater than about 20%, no greater than about 10%, or no greater than about 5% of the total volume. Nevertheless, the total amount of the components in a fluid together equals to 100%.

It was found that the fluids having higher dipole moments result in more rapid alignment of the nanoparticles. Therefore, in an embodiment, the fluids of the present composites have a dipole moment at least or greater than about zero (0), at least or greater than about one (1), greater than or about two (2), greater than or about (3). Examples of fluids for use in the present composites and their corresponding dipole moments include, hexane (with a dipole moment of zero (0)), water (with a dipole moment of 1.85), and dimethylformamide (DMF) (with a dipole moment of 3.82).

Hydrophilic Fluid

Hydrophilic fluids of the present composites include hydrophilic liquid that are miscible with water, non-limiting examples include, but are not limited to, water, aliphatic alcohols, alkylene glycols, di(alkylene) glycols, monoalkyl ethers of alkylene glycols or di(alkylene) glycols, and various mixtures thereof. Suitable aliphatic alcohols contain no greater than 6 carbons and no greater than 4 hydroxyls, such as methanol, ethanol, isopropanol, and glycerol.

Suitable alkylene glycols contain no greater than 5 carbons, such as ethylene glycol, propylene glycol, and 1,2-butylene glycol. In a particular embodiment, the hydrophilic fluid comprises ethylene glycol, propylene glycol, and mixtures thereof. Ethylene glycol and propylene glycol are excellent antifreeze agents and also markedly reduce the freezing point of water. Suitable di(alkylene) glycols contain no greater than 10 carbons, such as diethylene glycol, triethylene glycol, tetraethylene glycol, and dipropylene glycol.

As used herein, the term "alkylene glycol" refers to a molecule having glycol functional moiety in its structure in general, including alkylene glycol, alkylene glycols, di(alkylene) glycols, tri(alkylene) glycols, tetra(alkylene) glycols, and their various derivatives, such as ethers and carboxylic esters.

Hydrophobic Fluid

Hydrophobic fluids of the present composites can be selected from a wide variety of well-known organic oils (also known as base oils), including petroleum distillates, synthetic petroleum oils, greases, gels, oil-soluble polymer composition, vegetable oils, and combinations thereof. Petroleum distillates, also known as mineral oils, generally include paraffins, naphthenes and aromatics.

Synthetic petroleum oils are the major class of lubricants widely used in various industries. Some examples include alkylaryls such as dodecylbenzenes, tetradecylbenzenes, dinonylbenzenes, and di-(2-ethylhexyl)benzenes, polyphenyls such as biphenyls, terphenyls, and alkylated polyphenyls; fluorocarbons such as polychlorotrifluoroethylenes and copolymers of perfluoroethylene and perfluoropropylene; polymerized olefins such as polybutylenes, polypropylenes, propylene-isobutylene copolymers, chlorinated polybutylenes, poly(l-octenes), and poly(l-decenes), organic phosphates such as triaryl or trialkyl phosphates, tricresyl phosphate, trioctyl phosphate, and diethyl ester of decylphosphonic acid; and silicates such as tetra(2-ethylhexyl)silicate, tetra(2-ethylbutyl)silicate, and hexa(2-ethylbutoxy)disiloxane. Other examples include polyol esters, polyglycols, polyphenyl ethers, polymeric tetrahydrofurans, and silicones.

In one embodiment of the present composites, the hydrophobic fluid is a diester which is formed through the condensation of a dicarboxylic acid, such as adipic acid, azelaic acid, fumaric acid, maleic acid, phtalic acid, sebacic acid, suberic acid, and succinic acid, with a variety of alcohols with both straight, cyclic, and branched chains, such as butyl alcohol, dodecyl alcohol, ethylene glycol diethylene glycol monoether, 2-ethylhexyl alcohol, isodecyl alcohol, hexyl alcohol, pentaerytheritol, propylene glycol, tridecyl alcohol, and trimethylolpropane. Modified dicarboxylic acids, such as alkenyl malonic acids, alkyl succinic acids, and alkenyl succinic acids, can also be used. Specific examples of these esters include dibutyl adipate, diisodecyl azelate, diisooctyl azelate, dihexyl fumarate, dioctyl phthalate, didecyl phthalate, di(2-ethylhexyl)sebacate, dioctyl sebacate, dicicosyl sebacate, and the 2-ethylhexyl diester oflinoleic acid dimer, the complex ester formed by reacting one mole of sebacic acid with two moles of tetraethylene glycol and two moles of 2-ethylhexanoic acid.

In another embodiment, the hydrophobic fluid is a polyalphaolefin which is formed through oligomerization of 1-olefins containing 2 to 32 carbon atoms, or mixtures of such olefins. Some common alphaolefins are 1-octene, 1-decene, and 1-dodecene. Examples of polyalphaolefins include poly-1-octene, poly-1-decene, poly-1-dodecene, mixtures thereof, and mixed olefin-derived polyolefins. Polyalphaolefins are commercially available from various sources, including DURASYN® 162, 164, 166, 168, and 174 (BP-Amoco Chemicals, Naperville, Ill.), which have viscosities of 6, 18, 32, 45, and 460 centistokes, respectively.

In yet another embodiment, the hydrophobic fluid is a polyol ester which is formed through the condensation of a monocarboxylic acid containing 5 to 12 carbons and a polyol and a polyol ether such as neopentyl glycol, trimethylolpropane, pentaerythritol, dipentaerythritol, and tripentaerythritol. Examples of commercially available polyol esters are ROYCO® 500, ROYCO® 555, and ROYCO® 808. ROYCO® 500 contains about 95% of pentaerythritol esters of saturated straight fatty acids with 5 to 10 carbons, about 2% of tricresyl phosphate, about 2% of N-phenyl-alphanaphthylamine, and about 1% of other minor additives. ROYCO® 808 contains about 30 to 40% by weight of trimethylolpropane esters of heptanoic, caprylic and capric acids, 20 to 40% by weight of trimethylolpropane esters of valeric and heptanoic acids, about 30 to 40% by weight of neopentyl glycol esters of fatty acids, and other minor additives.

Generally, polyol esters have good oxidation and hydrolytic stability. The polyol ester for use herein preferably has a pour point of about −100° C. or lower to −40° C. and a viscosity of about 2 to 100 centistoke at 100° C.

In yet another embodiment, the hydrophobic fluid is a polyglycol which is an alkylene oxide polymer or copolymer. The terminal hydroxyl groups of a polyglycol can be further modified by esterification or etherification to generate another class of known synthetic oils. Interestingly, mixtures of propylene and ethylene oxides in the polymerization process will produce a water soluble lubricant oil. Liquid or oil type polyglycols have lower viscosities and molecular weights of about 400, whereas 3,000 molecular weight polyglycols are viscous polymers at room temperature.

In yet another embodiment, the hydrophobic fluid is a combination of two or more selected from the group consisting of petroleum distillates, synthetic petroleum oils, greases, gels, oil-soluble polymer composition, and vegetable oils. Suitable examples include, but not limited to, a mixture of two polyalphaolefins, a mixture of two polyol esters, a mixture of one polyalphaolefine and one polyol ester, a mixture of three polyalphaolefins, a mixture of two polyalphaolefins and one polyol ester, a mixture of one polyalphaolefin and two polyol esters, and a mixture of three polyol esters. In these embodiments, the thermal transfer fluid preferably has a viscosity of from about 1 to about 1,000 centistokes, more preferably from about 2 to about 800 centistokes, and most preferably from about 5 to about 500 centistokes.

In yet another embodiment, the hydrophobic fluid is grease which is made by combining a petroleum or synthetic lubricating fluid with a thickening agent. The thickeners are generally silica gel and fatty acid soaps of lithium, calcium, strontium, sodium, aluminum, and barium. The grease formulation •can also include coated clays, such as bentonite and hectorite clays coated with quaternary ammonium compounds. Sometimes carbon black is added as a thickener to enhance high-temperature properties of petroleum and synthetic lubricant greases. The addition of organic pigments and powders which include arylurea compounds indanthrene, ureides, and phthalocyanines provide high temperature stability. Sometimes, solid powders such as graphite, molybdenum disulfide, asbestos, talc, and zinc oxide are also added to provide boundary lubrication. Formulating the foregoing synthetic lubricant oils with thickeners provides specialty greases. The synthetic lubricant oils include, without limitation, diesters, polyalphaolefins, polyol esters, polyglycols, silicone-diester, and silicone lubricants. Nonmelting thickeners are especially preferred such as copper phthalocyanine, arylureas, indanthrene, and organic surfactant coated clays.

Friction Modifiers

Suitable friction modifiers include aliphatic amines, aliphatic fatty acid amides, aliphatic carboxylic acids, aliphatic carboxylic esters, aliphatic carboxylic esterarnides, aliphatic phosphonates, aliphatic phosphates, aliphatic thiophosphonates, and aliphatic thiophosphates, wherein the aliphatic group usually contains above about eight carbon atoms so as to render the compound suitably oil soluble. Also suitable are aliphatic substituted succinimides formed by reacting one or more aliphatic succinic acids or anhydrides with ammonia.

Pour Point Depressants

Embodiments of the present composites can include pour point depressants. Most pour point depressants are organic polymers, although some nonpolymeric substances have been shown to be effective. Both nonpolymeric and polymeric depressants can be used in the present composites. Examples include alkylnaphthalenes, polymethacrylates, polyfumarates, styrene esters, oligomerized alkylphenols, phthalic acid esters, ethylenevinyl acetate copolymers, and other mixed hydrocarbon polymers. The treatment level of these additives is usually low. In nearly all cases, there is an optimum concentration above and below which pour point depressants become less effective.

Scale Inhibitors

Embodiments of the present composites can include scale inhibitors. Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer. The basic compositions herein can be tailored for selective applications. For example, nitrates and silicates are known to provide aluminum protection. Borates and nitrites can be added for ferrous metal protection, and benzotriazole and tolytriazole can be added for copper and brass protection.

Seal-Swelling Agents

Embodiments of the present composites can include seal-swelling agents. Suitable seal-swelling agents include dialkyl diesters of adipic, azelaic, sebacic, and phthalic acids. Examples of such materials include n-octyl, 2-ethylhexyl, isodecyl, and tridecyl diesters of adipic acid, azelaic acid, and sebacic acid, and n-butyl, isobutyl, pentyl, hexyl, heptyl, octyl, nonyl, decyl, undecyl, dodecyl, and tridecyl diesters of phthalic acid. Also useful are aromatic hydrocarbons with suitable viscosity.

Thickening Agent

Embodiments of the present composites can include thickening agents. Non-limiting examples, of thickening agents include, but are not limited to, silica gel and fatty acid soaps of lithium, calcium, strontium, sodium, aluminum, and barium.

Viscosity Improvers

Suitable viscosity improvers include olefin copolymers, polymethacrylates, hydrogenated styrene-diene, and styrene-polyester polymers. Also suitable are acrylic polymers such as polyacrylic acid and sodium polyacrylate; high-molecular-weight polymers of ethylene oxide; cellulose compounds such as carboxymethylcellulose; polyvinyl alcohol; polyvinylpyrrolidone; xanthan gums and guar gums; polysaccharides; alkanolarnides; amine salts of polyamides hydrophobically modified ethylene oxide urethane; silicates; and fillers such as mica, silicas, cellulose, wood flour, clays (including organoclays) and nanoclays; and resin polymers such as polyvinyl butyral resins, polyurethane resins, acrylic resins and epoxy resins.

Exemplary Embodiments

Exemplary ranges of the nanoparticle composite compositions according to an embodiment of the present composites are shown in Table 1. Ingredients are described in weight percent of the total composition.

TABLE 1

| Ingredient | A | B | C | D |
|---|---|---|---|---|
| Host Material | 40-99.9 wt. % | 45-95 wt. % | 55-90 wt. % | 70-85 wt. % |
| Magnetically Sensitive Nanoparticles | 0.01-15 wt. % | 0.1-10 wt. % | 1-8 wt. % | 2-6 wt. % |
| Carbon Nanoparticles | 0.01-20 wt. % | 0.1-15 wt. % | 1-10 wt. % | 2-8 wt. % |
| Surfactant | 0.01-40 wt. % | 0.1-30 wt. % | 1-25 wt. % | 5-20 wt. % |

In an exemplary embodiment of the present composites, a surfactant combined with a method of physical agitation, preferably ultrasonication, can be used to aid the dispersion of nanoparticles in the liquid polymer. After the surfactant has been adsorbed on the nanoparticles' surface, ultrasonication can help a surfactant to debundle the nanoparticles by steric or electrostatic repulsions. The effect of the nanoparticles, surfactant, and ultrasonication on the tensile property of composite was investigated (as discussed in the Examples section). It was found that the amount of surfactant in relationship to the nanoparticles and the amount of time and intensity of physical agitation, had a significant effect on the mechanical properties and noticeable enhanced the tensile strength as compared to those of the polymer matrix material alone.

Thus, in some aspects of the present composites, the ratio of the nanoparticles to the surfactant is important to providing enhanced physical and mechanical properties such as improved tensile strength. As such, the nanoparticles and surfactant can be in a ratio of from about 1:1 to about 1:20, preferably from about 1:3 to about 1:15, more preferably from about 1:5 to about 1:12. In a particular embodiment the ratio of nanoparticle to surfactant is between about 1:7 and about 1:10. Ranges for the ratios recited are inclusive of the numbers defining the range and include each integer within the defined range of ratios.

The present composites have improved mechanical, electric, and thermal properties. For example, in embodiments of the invention the nanoparticle composites have a tensile strength improvement of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, or even more than 100%. For further example, embodiments of the present composites have improved electrical conductivity of about at least 1 order of magnitude, of at least 2 orders of magnitude, of at least 3 orders of magnitude, of at least 4 orders of magnitude, of at least 5 orders of magnitude, of at least 6 orders of magnitude, of at least 7 orders of magnitude, of at least 8 orders of magnitude, of at least 9 orders of magnitude, or of at least 10 orders of magnitude.

The present compositions can be prepared in many diverse forms, with many different properties, and for many intended applications. For example, present compositions can form light-weight composites with improved tensile strength, composites that are thermally and electrically conductive, and composites useful as armor, in particular body armor, composites for use in aircraft. Compositions can be prepared for particular uses and to exhibit desired properties.

Methods

The present nanoparticle composites can be prepared and used in many diverse applications. For example, the compositions can be prepared as composite films. In an aspect of present composite, films can be prepared through a draw-down process, blown film process, injection molding process, or other molding processes, or any other process for preparing composite films and materials. Various methods are available for preparing and solidifying the composite liquid to form a composite film or other material. Various uses for the nanoparticle composite and discern which solidification process can be employed. For example, suitable means of solidification can be applied, depending on the nature of the polymer, monomer or oligomer liquid, including but not limited to heating, cooling, UV curing, and electron-beam curing.

While an understanding of the mechanism is not necessary to practice the present compositions and methods, and while the present compositions and methods are not limited to any particular mechanism of action, it is contemplated that, in some embodiments, the nanoparticle composites can be prepared by the methods described herein, variations of the methods described herein, and in other ways. The following are exemplary embodiments of the present composites and it should be understood that the embodiments are not exclusive and can be varied in many ways.

The magnetically aligned carbon nanoparticles of the present composites are prepared by adding the carbon nanoparticles, surfactant, and MSPs to a liquid. In particular embodiments, the liquid can include a molten host material. In another embodiment of the present composites, the liquid can include the host material dissolved in a solvent. In another aspect of the present composites, the carbon nanoparticles, surfactant, and MSPs can be added to a solvent. Following dispersion in the solvent, the solvent can be evaporated through any suitable means of solvent evaporation and the dried mixture of carbon nanoparticles, surfactant, and MSPs is added to the liquid host material. In another embodiment of the present composites, the carbon nanoparticles, surfactant, and MSPs can be kept in the solvent and added to liquid host material.

The host material can be provided in a liquid state. Examples of suitable liquid states for the host material include providing it as a resin that can be solidified by curing, as a polymer solution that can be solidified by solvent evaporation, as a molten polymer that can be solidified by cooling, or as a monomer or oligomer that can be solidified by in-situ polymerization, and combinations thereof.

Figure 5:
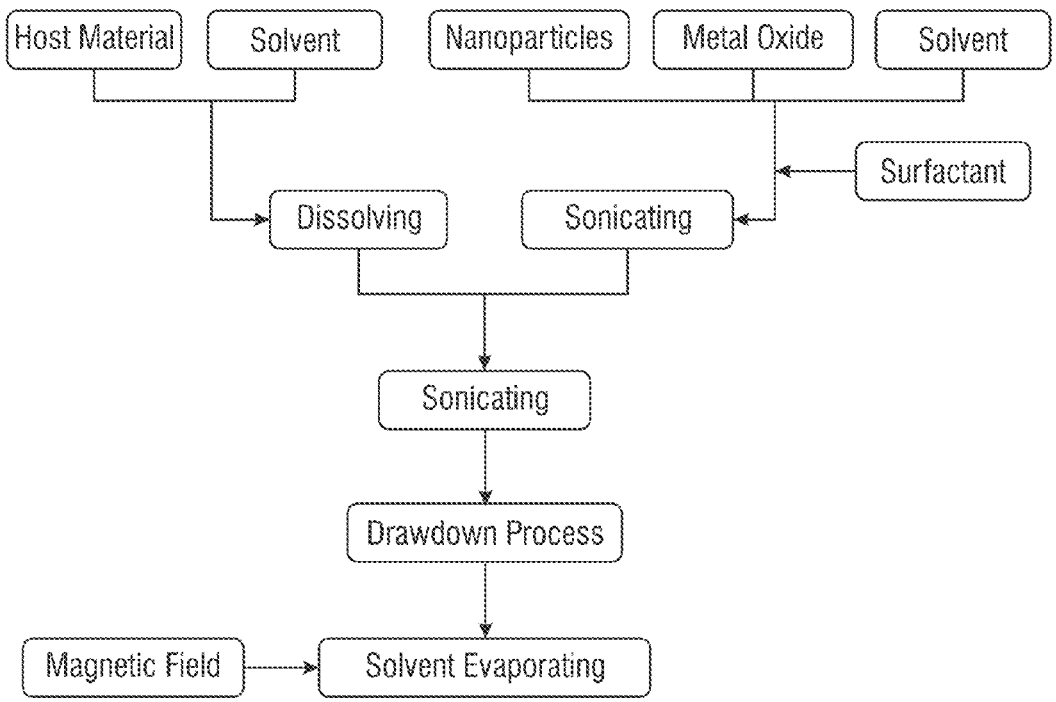
FIG. 5 shows a flowchart for an exemplary method of preparing magnetically aligned nanoparticle composite films using a solvent.

In an exemplary embodiment of the present composites, depicted in FIG. 5 the magnetically aligned carbon nanoparticle composites are prepared by dissolving and/or mixing host material in solvent. The host material can be in dry or liquid form. Any suitable method for dissolving and/or mixing can be used, including the use of physical agitation and heat. Separately, carbon nanoparticles and magnetically sensitive nanoparticles are mixed in solvent. Any suitable method of mixing can be used, including the use of physical agitation. Once thoroughly mixed, surfactant can be added to the carbon nanoparticle, magnetically sensitive nanoparticle, solvent mixture and mixed. Any suitable method of mixing can be used, including physical agitation. This mixture of nanoparticles, magnetically sensitive nanoparticles and surfactant in solvent is physically agitated. The mixture of carbon nanoparticles, magnetically sensitive nanoparticles and surfactant in solvent can then added to the host material liquid to form a host material/nanoparticle composite liquid. The host material/nanoparticle composite liquid can be physically agitated to disperse the nanoparticles in the host material liquid.

The host material/nanoparticle composite liquid can then be prepared for processing into a film or mold. In one embodiment, the process is a drawdown process, but other suitable processes can be employed as well. In a drawdown process, the host material/nanoparticle solution is poured onto a sheet and a Mayer rod is drawn across the surface of the host material/nanoparticle solution from top to bottom so as to draw down a thin continuous layer. In the process of solvent evaporating, a magnetic field can be applied on the composite film.

The host material/nanoparticle composite solution goes through an evaporation step, where the excess solvent is evaporated. The solvent evaporation step can be performed at any suitable temperature and humidity and can be optimized based on the solvent employed in the host material/nanoparticle composite preparation. During the evaporation step, the host material/nanoparticle composite can be subjected to a magnetic field in order to magnetically align the nanoparticles in the host material. Any means of subjecting the host material/nanoparticle liquid to a magnetic field can be employed. In a particular embodiment, the host material/nanoparticle composite is placed between two magnets. The strength of magnetic field can be adjusted by changing the distance between magnets. The carbon nanoparticle composite can be subjected to the magnetic field for any portion of the evaporation step or for the entire evaporation step. Following the solvent evaporation step, the composite film can be removed from the sheet and optionally solidified for an additional amount of time. In one method embodiment, the additional solidification time can be up to 10 days, up to 7 days, up to 5 days, up to 3 days, up to 2 days, or up to 1 day.

In another embodiment of the present method, the magnetically aligned carbon nanoparticle composites are prepared by melting the host material so that it is in a molten state. Any suitable method for melting the host material mixing can be used. Preferably, the carbon nanoparticles and magnetically sensitive nanoparticles are mixed in solvent. Any suitable method of mixing can be used, including the use of physical agitation. Once thoroughly mixed, surfactant can be added to the carbon nanoparticle, magnetically sensitive nanoparticle, solvent mixture and mixed. Any suitable method of mixing can be used, including physical agitation. This mixture of carbon nanoparticles, magnetically sensitive nanoparticles and surfactant in solvent is physically agitated. The mixture of carbon nanoparticles, magnetically sensitive nanoparticles and surfactant in solvent can then be dried so that the solvent evaporates. After drying the mixture of carbon nanoparticles, magnetically sensitive nanoparticles and surfactant is added to the molten host material to form a host material/nanoparticle composite liquid. The host material/nanoparticle composite liquid can be physically agitated to disperse the carbon nanoparticles in the host material liquid.

The host material/nanoparticle composite liquid can then be prepared for processing into a film or mold. In one embodiment, the process is a drawdown process, but other suitable processes can be employed as well. In a drawdown process, the host material/nanoparticle solution is poured onto a sheet and a Mayer rod is drawn across the surface of the host material/nanoparticle liquid from top to bottom so as to draw down a thin continuous layer. In the process of solidifying, a magnetic field can be applied to the composite film.

The host material/nanoparticle composite liquid goes through a solidification step, where the molten host material solidifies, in some embodiments the solidification can comprise curing. The solidification step can be performed at any suitable temperature and humidity and can be optimized based on the host material employed in the host material/nanoparticle composite preparation. Prior to or during the solidification step, the host material/nanoparticle composite can be subjected to a magnetic field in order to magnetically align the nanoparticles in the host material. Any means of subjecting the host material/nanoparticle liquid to a magnetic field can be employed. In a particular embodiment, the host material/nanoparticle composite is placed between two magnets. The strength of magnetic field can be adjusted by changing the distance between magnets. The carbon nanoparticle composite can be subjected to the magnetic field for any portion of the solidification step or for the entire solidification step. Following the solidification step, the composite film can be removed from the sheet and optionally solidified for an additional amount of time. In one embodiment of the present method, the additional amount of solidification time can involve curing for up to 10 days, up to 7 days, up to 5 days, up to 3 days, up to 2 days, or up to 1 day.

Solvent

In some embodiments, the present methods can include one or more solvents. The solvents can be employed to dissolve and/or disperse the polymer, nanoparticles, MSPs, and/or surfactant. Suitable solvents can be polar or non-polar, protic or aprotic. The solvent can be any individual solvent or a combination of solvents. Examples of suitable non-polar solvents include benzene, chloroform, dichloromethane, diethyl ether, 1,4-dioxane, hexane, and toluene. Examples of suitable polar aprotic solvents include acetone, acetonitrile, amides such as dimethylacetamide, dimethylformamide (DMF), hexamethylphosphoramide, and n-methylpyrrolidone, dimethyl sulfoxide (DMSO), ethyl acetate, and tetrahydrofuran (THF). Examples of suitable polar protic solvents include acetic acid, n-butanol, ethanol, formic acid, isopropanol, methanol, nitromethane, and water. In a preferred embodiment, the solvent includes a polar solvent. In a more preferred embodiment, the solvent includes acetone DMF, DMSO, THF, ethanol, methanol, water, and combinations thereof. In an even more preferred embodiment, the solvent includes water.

The amount of solvent added will depend on the specific solvent, specific polymer, and the volume of polymer added. In one embodiment of the present method, the solvent should be added in an amount sufficient to fully dissolve the polymer and an amount sufficient to disperse the carbon nanoparticles and magnetic nanoparticles. However, the use of excess solvent can extend the duration of the evaporation/drying step in the curing process.

In embodiments employing a solvent, the solvent employed in the present methods evaporate and are not present in the resulting compositions. The present composites can contain less than about 5 wt-% solvent, preferably less than about 2 wt-% solvent, more preferably less than about 1 wt-%, even more preferably the composites are substantially free of solvent. Thus, embodiments of the composite contain less than about 0.5 wt-% solvent, preferably less than 0.1 wt-% solvent, and in yet another embodiment, the amount of solvent is less than 0.01 wt-%.

Physical Agitation

A uniform and stable dispersion of nanoparticles plays an important role in carbon nanoparticle reinforced composite film. Bundles of poorly dispersed carbon nanoparticles in a composite will cause non-uniform load and weaken the strength and other desired characteristics of the composite. Thus, the present methods can employ physical agitation to prepare the carbon nanoparticle composites.

The present composites prepared by conventional means of dispersing a mixture of the appropriate carbon nanoparticles, magnetically sensitive nanoparticles, surfactant(s), and/or other optional chemical additives. For example, a common approach is using a physical method to form a stable suspension of nanoparticles in a fluid. A variety of physical mixing methods are suitable for use in the present methods, including a conventional mortar and pestle mixing, high shear mixing, such as with a high speed mixer, milling, homogenizers, microfluidizers, high impact mixing, stirring (both manually and/or with the use of a stir bar), and ultrasonication methods. The various physical mixing methods can be performed at room temperature, cooled temperatures, and/or heated temperatures.

A preferred method of physical agitation is performed by stirring, in particular with the use of a stir bar. Ultrasonication is another preferred method of physical agitation as ultrasonication is one of the least destructive methods to the structures of nanoparticles, in particular carbon nanotubes. Ultrasonication can be done either in the bath-type ultrasonicator, or by the tip-type ultrasonicator. Typically, tip-type ultrasonication is for applications which require higher energy output. Ultrasonication at an intermediate intensity for up to 60 minutes. Additionally, the mixture can be ultrasonicated intermittently to avoid overheating. It is well known that overheating can cause covalent bond breakage in a carbon nanotube, which causes the nanotube to lost its beneficial physical properties. As such, the carbon nanoparticle-containing mixture is generally energized for a predetermined period of time with a break in between. Each energizing period is no more than about 30 min, no more than about 15 min, no more than 10 min, no more than 5 min, no more than 2 min, no more than 1 min, or no more than 30 seconds. The break between ultrasonication pulses provides the opportunity for the energized carbon nanoparticles to dissipate the energy. The break is typically no less than about 1 min, no less than about 2 min, no less than about 5 min, or between about 5 to about 10 min.

The raw material mixture can also be pulverized by any suitable known dry or wet grinding method. One grinding method includes pulverizing the raw material mixture in a liquid to obtain a concentrate, and the pulverized product can then be dispersed further in the liquid host material with the aid of the dispersants described above, such as surfactants. However, pulverization or milling often reduces the carbon nanoparticle average aspect ratio.

It will be appreciated that the individual components can be separately blended into the liquid host material, or can be blended therein in various subcombinations, if desired. Ordinarily, the particular sequence of such blending steps is not critical. Moreover, such components can be blended in the form of separate solutions in a diluent. It is preferable, however, to blend the components used in the form of an additive concentrate, as this simplifies the blending operations, reduces the likelihood of blending errors, and takes advantage of the compatibility and solubility characteristics afforded by the overall concentrate.

In an embodiment of the present method, the method of physical agitation includes stirring and/or ultrasonication. In another aspect of the present method, the dispersing steps can include ultrasonication. In an aspect of the present method, the duration of the ultrasonication is between about 5 seconds and about 50 minutes, preferably between about 5 minutes and about 40 minutes, more preferably between about 10 minutes and about 30 minutes, and even more preferably between about 15 minutes and about 20 minutes. In another aspect of the present method, the intensity of the ultrasonication is between about 5% and about 80% amplification, preferably between about 10% and about 70% amplification, more preferably between about 20% and about 60% amplification, and most preferably between about 30% and about 50% amplification.

Solidification

In an aspect of the present method, the liquid host material is solidified. In an embodiment this can include curing. This can also include solvent evaporation/drying. In an embodiment of the present method, the solidification step can be performed at room temperature (~23° C.). In another embodiment of the present method, the solidification step can be performed at temperatures less than about 23° C. When the solidification step is performed at temperatures lower than room temperature, the composite can be cooled by any suitable means of cooling or reducing the temperature. The solidification step can be performed at a temperature below room temperature for only a portion of the solidification step or for the entire solidification step. When the solidification step is performed both at room temperature and at a temperature below room temperature, the solidification step performed at a temperature below room temperature is referred to as "cooled solidification." In another embodiment of the present method, the solidification step can be performed at temperatures greater than about 23° C. When the solidification step is performed at temperatures greater than room temperature, the composite can be heated by any suitable method including, for example, in an oven, vacuum oven, or temperature and/or humidity controlled room. The solidification step can be performed at a temperature in excess of room temperature for only a portion of the solidification step or for the entire solidification step. When the solidification step is performed both at room temperature and at a temperature in excess of room temperature, the evaporation/drying step in excess of room temperature is referred to as "heated solidification." In an embodiment where solvent evaporation is occurring, this may be referred to as "heated solvent evaporation." The term "solidification" includes heated solidification, cooled solidification, and solidification performed at room temperature. In methods employing heated solvent evaporation, the temperature selected should be less than the flash point of the solvent, but can be as high as the boiling point of the solvent, or even in excess of the boiling point of the solvent.

In an embodiment of the present method, the solidification step is performed at a temperature greater than about 20° C., preferably between about 30° C. and about 120° C., more preferably between about 40° C. and about 100° C., and most preferably between about 60° C. and 80° C. In another embodiment of the present method, the solidification step is performed at a temperature less than about 20° C., preferably between about −50° C. and about 20° C., more preferably between about −30° C. and about 15° C., and most preferably between about −10° C. and 10° C.

Magnetic Field

Magnets and magnet field generating devices are well-known. The magnetic field used in the present method can be generated by any conventional means for creating a magnetic field. Common magnets or devices that generate a magnetic field include, but are not limited to, permanent magnets, magnetic materials that create a changing magnetic field, ferromagnetic components, and solenoid magnets. The magnets or magnetic material can be fluxing, fixed, moving or otherwise, and can create pulsed, changing, fluxing, modulating, and/or fixed/constant magnetic, waved or energy fields (as a few examples). They can including alternating poles, north poles, south poles, or combinations thereof, and different shapes of the magnets and magnetic fields, within the same magnet or magnetic layer.

The magnetic fields can be of any strength, which is typically measured as Gauss (G) or Tesla (T) units (with 1 T=104 G). Generally, the speed of alignment increases with increasing magnetic field strength. Therefore, magnetic field generators or magnets with various strengths can be selected to provide a desirable alignment speed.

In an embodiment of the present method, the magnetic field is provided by a pair of spaced, Ba-ferrite magnet plates. A magnetic field is created in-between the gap of the two plates. To be exposed to the magnetic field generated by the magnet plates, the composition is placed in the gap in-between the magnetic plates.

Magnetic particles in a liquid medium can assume a variety of configurations, depending on the nature of the magnetic particles and the strength of the magnetic field. (See, for example, McCormack, et al., J. Electron. Mater. 23 (1994) 715-720; Philip, et al., Appl. Phys. Lett. 92 (2008) 043108-043110; Shima, et al., J. Phys. Chem. 114 (2010) 18825-18833; Zhu, et al., Appl. Phys. Lett. 89 (2006) 023123-023125). Under a magnetic field, small magnetic particles form interconnected networks and tend to get become spatially oriented along the magnetic field. This in turn, can move the nanoparticles nearby and induce more physical contacts, which is anticipated to improve thermal conductivity (See, for example, Wright, et al., Appl. Phys. Lett. 91 (2007) 173116-173118; Horton, et al., J. Appl. Phys. 107 (2010) 104320-104322).

The amount of alignment is related to the amount of time of exposure to a magnetic field and to the strength of the magnetic field. Therefore, it was found that at a certain period of time of exposure to a magnetic field (namely, $T_{max}$), alignment reaches a maximum and the enhanced or increased composite characteristics will also reach a maximum. After this $T_{max}$, there was found to be either no further increased alignment (and enhanced or increased polymer characteristics) or reduced alignment (and reduced or decreased polymer characteristics) from $T_{max}$.

Thus, in an embodiment of the present method, the duration that the composition is subjected to the magnetic field is for less than 10 seconds, less than 30 seconds, less than 1 minute, less 5 minutes, less than about 10 minutes, less than about 30 minutes, less than about 1 hour. In another aspect of the present method, the duration that the composition is subjected to the magnetic field is as much as about 72 hours, as much as about 60 hours, as much as about 48 hours, as much as about 36 hours, as much as about 30 hours, as much as about 24 hours. In another aspect of the present method, the strength of the magnetic field is between about 0.01 kG and about 1 terra Gauss (TG), preferably between about 0.02 kG and about 500 kG, more preferably between about 0.03 kG and about 200 kG, and most preferably between about 0.04 kG and about 20 kG. In a particular embodiment, the preferred magnetic field strength is about 0.05 kG. Moreover, in an aspect of the present method, it should be understood that the time the composite is subjected to the magnetic field can be influenced by the strength of the magnetic field.

Examples

The materials and equipment used in the following Examples were as follows:
(a) Dimethylformamide ("DMF") was obtained from Sigma Aldrich.
(b) Dimethyl sulfoxide ("DMSO") was obtained from Sigma Aldrich.
(c) Single-walled carbon nanotubes ("C-SWNT") were obtained from Helix Material Solutions Inc. in Richardson, Tex.
(d) Magnetically sensitive $Fe_2O_3$ nanoparticles, with an average diameter of 5-25 nm were obtained from Sigma Aldrich.
(e) Hydrolyzed polyvinyl alcohol (98-99%) ("PVA") was obtained from Sigma Aldrich.
(f) Sodium dodecylbenzene sulfonate (NaDDBS) was obtained from Sigma Aldrich.
(g) Sonication was performed using a Branson Digital Sonifier, model 450.
(h) Microscope images were provided by a Redlake Model PCI-2000S Motion Scope available from MASD Inc. in San Diego, Calif.
(i) West System 105 Epoxy was provided by West System Company.

Additional ingredients and equipment included distilled water, a glass sheet, Mayer rod, vacuum oven, hot plate, and stir bar.

Tensile Test Work Program

The mechanical properties of composite films prepared in the following Examples were evaluated through tensile strength testing. The tensile test results were used to determine the extent of reinforcement provided by SWNT dispersed in the polymer matrix using different compositions and methods of preparation. The various compositions discussed in the following examples were tested for tensile strength according to the ASTM D 882-97 Standard Test Method for Tensile Properties of Thin Plastic Sheeting ("ASTM Method"). According to this method, composite polymer films were prepared according the methods set forth below and allowed to solidify for at least 40 hours at about 23° C. and about 30-40% humidity. The composite polymer films were about 11 inches long and 9 inches wide. Tensile samples were cut from these large composite polymer film sheets with a razor blade and straight edge. According to the ASTM Method, tensile test specimens must have a width no less than 5 mm and no greater than 25.4 mm. The strips were cut into widths of either 25.4 mm or 12.7 mm with a uniform width. Strips were as wide as possible to minimize the effects of edge flaws. The strip length was arbitrarily chosen to be at least 4 inches, and the initial grip separation was 2 inches less than the length of the test strip.

The test method used was the default Tensile Test method provided by the MTS Test Works 4 program used to control the MTS electromechanical test system. The speed of testing was 5.1 mm/min according to the ASTM Method's equation:

(rate of grip separation)=((initial distance between grips)*(initial strain rate))

Figure 6:
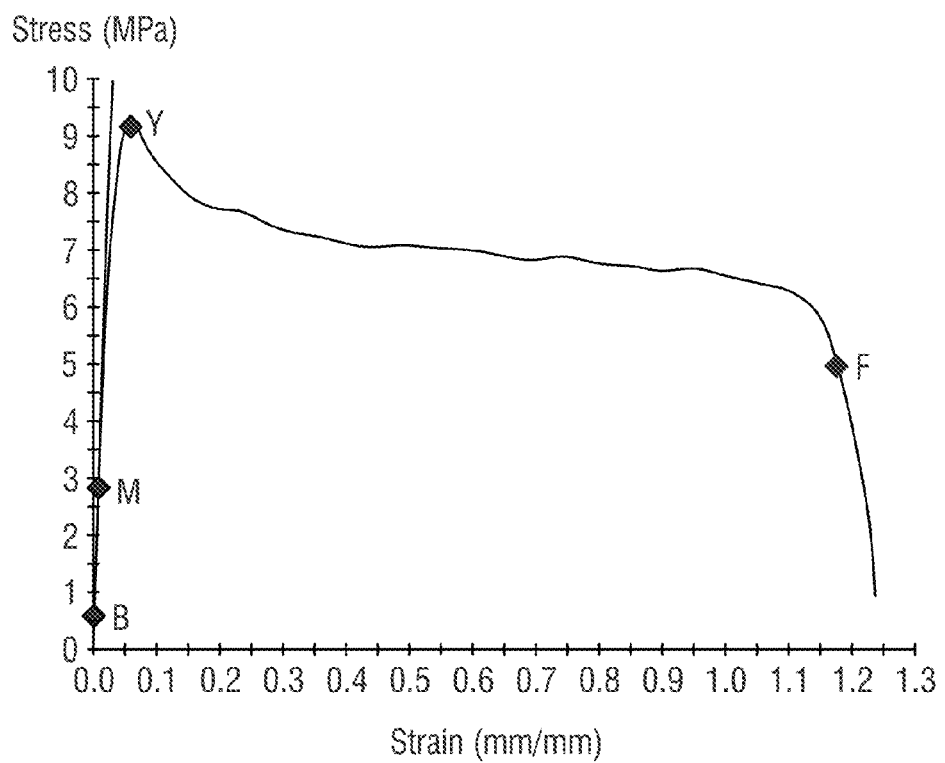
FIG. 6 shows a stress-strain diagram obtained from Test Works 4 program using the default Tensile Test Method.

After performing a tensile test, a diagram of stress versus strain was plotted by the Test Works program (FIG. 6). Strain is plotted on the horizontal axis and stress on the vertical axis. The diagram begins with a straight line from point B to point M, which means that the relationship between stress and strain in this initial region is linear and proportional. With an increase in stress beyond the proportional limit, the strain begins to increase rapidly from point M to point Y. This process is known as yielding of the material, and point Y is called the yield point. The corresponding stress is known as the yield stress. After undergoing the strain hardening that occurs from Y to F, the stress-strain curve reaches point F, where the stress start to drop significantly. Tensile strength values in this work were the yield stress.

The number of specimens tested in each Example was also chosen according to ASTM Method. The ASTM Method states that for isotropic materials at least five samples must be tested, and for anisotropic materials at least five samples normal and five parallel to the principal axis of anisotropy must be tested. Neat PVA, dispersed polymer/nanoparticle composite, and magnetic sensitive composite films were isotropy; so five samples were tested. The tensile strength of at least five samples was measured for each type of film and the average tensile strength value was adopted. For magnetic sensitive composite films, the samples should parallel to the magnetic field direction.

Example 1

Tensile Strength of Polymers Prepared with Differing Solvent Parameters

Polymer films employing different solvents were tested for tensile strength and compared for both tensile strength and the amount time required for preparation based on the solvent evaporation time. Three solvents were tested: water, DMF, and DMSO. The polymer films were prepared according to Table 2.

TABLE 2

| Solvent | Amount of Solvent | Amount of PVA |
|---------|-------------------|---------------|
| Water   | 40 ml             | 2 g           |
| DMF     | 40 ml             | 2 g           |
| DMSO    | 40 ml             | 2 g           |

Figure 7:
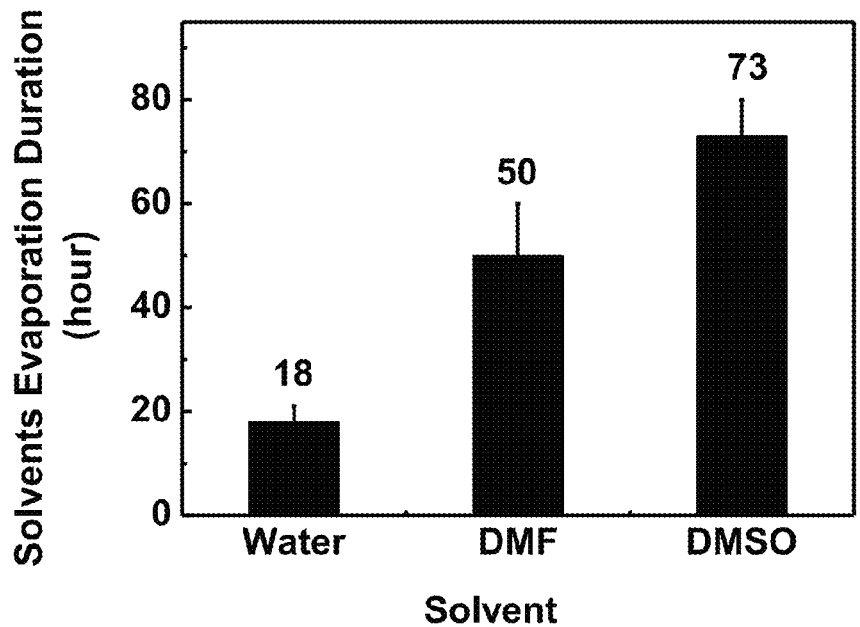
FIG. 7 shows evaporation durations using different solvents in the process of producing neat PVA films.

Polymer solutions of solvent and PVA were prepared by mixing the PVA with the solvent and placing the mixture on a Fisher Scientific isotemp basic stirring hotplate. The mixture was heated and stirred at a temperature between about 70° C. and about 80° C. until no solid PVA could be observed in polymer solution. This took between 30 minutes and 2 hours based on the solvent. The polymer films were prepared using the drawdown process. The PVA solutions were poured on the top center of horizontally-positioned glass sheet. A Mayer rod was drawn across the surface of the polymer solution with a smooth and continuous movement from top to bottom so as to draw down a thin, continuous layer. The excess solvent was evaporated from the polymer film on the glass. The evaporation times are compared in FIG. 7. Water had the most efficient evaporation time, about 18 hours. The DMF and DMSO required about 50 and 73 hours to evaporate, respectively. The polymer films were then removed for further solidifying (about 40 hours) and tensile strength analysis.

Figure 8:
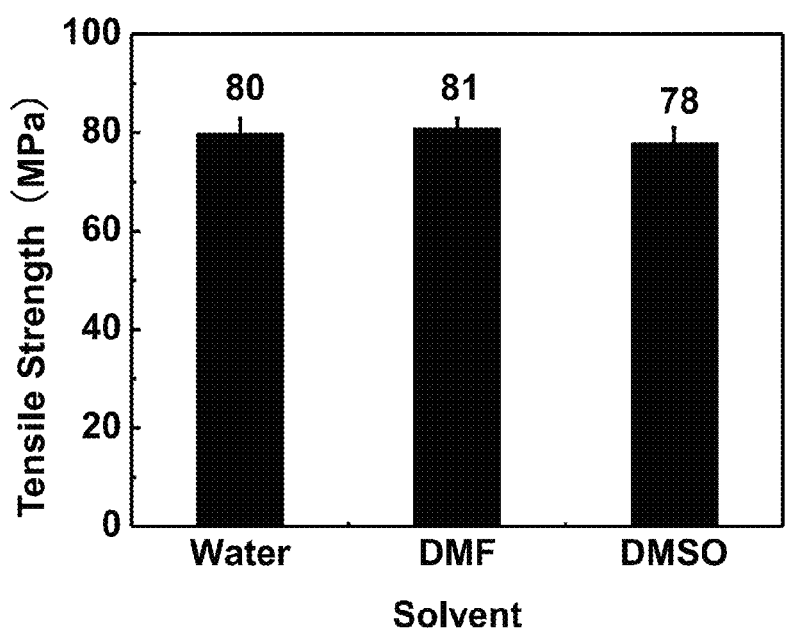
FIG. 8 shows the tensile strength of neat PVA films produced by dissolving in different solvents.

The tensile strength of the polymer films was analyzed according to the ASTM Method described above. FIG. 8 shows the tensile strength of the polymer films produced with the three solvents (water, DMF, and DMSO). Polymer films using DMF and DMSO as solvents showed no impressive improvement on tensile strength (81 MPa and 78 MPa, respectively) as compared to water (80 MPa). However, both organic solvents required much longer evaporation times when compared to water.

Thus, it was determined that water was substantially more efficient to produce with respect to time and provided better tensile strength than DMSO and nearly the same tensile strength as DMF. The tensile strength of the polymer films employing water as solvent correlate to the value of 83±6 MPa reported by Smalley et al., "Poly(vinyl alcohol)/SWNT Composite Film," Nano Letters, 2003, Vol. 3, No. 9, pp. 1285-1288, for the same material. This indicates that the measured tensile strength (80 MPa) for the PVA film in this experiment is an accurate value by which to compare the tensile strength values of the composite films. In light of these results, water was selected as the solvent for preparation of the neat polymer films which would serve as the standard tensile strength values of the carbon nanotube reinforced PVA composite films would be comparison.

Example 2

Tensile Strength of Polymers Prepared with Differing C-SWNT Parameters

Polymer/nanoparticle composites employing different weight percentages of C-SWNT were prepared to evaluate the effect of the amount of C-SWNT on the present compositions, in particular to determine their tensile strengths compared to the pure polymer matrix. The polymer composite films were prepared by dissolving dry PVA in distilled water using the same method used to prepare the neat polymer films. The surfactant was NaDDBS, an anionic surfactant. A 10:1 ratio of NaDDBS weight to SWNT weight was found to work well. The amount of NaDDBS and C-SWNT was determined as a weight percentage of the dry PVA. To produce a 1 wt % SWNT reinforced PVA film, the desire mass fraction of NaDDBS is 10 wt %. The amounts of C-SWNT and NaDDBS employed are provided in Table 3.

TABLE 3

| C-SWNT | NaDDBS |
|---|---|
| 1 wt. % | 10 wt. % |
| 2 wt. % | 20 wt. % |
| 3 wt. % | 30 wt. % |
| 4 wt. % | 40 wt. % |
| 5 wt. % | 50 wt. % |

The NaDDBS and C-SWNT were dispersed in water using ultrasonication. The water/surfactant-coated nanotube solution was sonicated for 15 minutes. The water/surfactant-coated nanotube solution was then added to the polymer solution and the mixture was sonicated for 15 minutes at 35% amplitude to disperse the nanotubes in the polymer solution. The polymer/nanoparticle composite solution was poured onto a glass sheet and drawn by the Mayer rod across the surface of the polymer solution from top to bottom so as to draw down a thin continuous layer. The polymer/nanoparticle composite film was allowed to solidify on the glass for 24 hours and then removed for further curing (about 40 hours) and tensile strength analysis.

Figure 9:
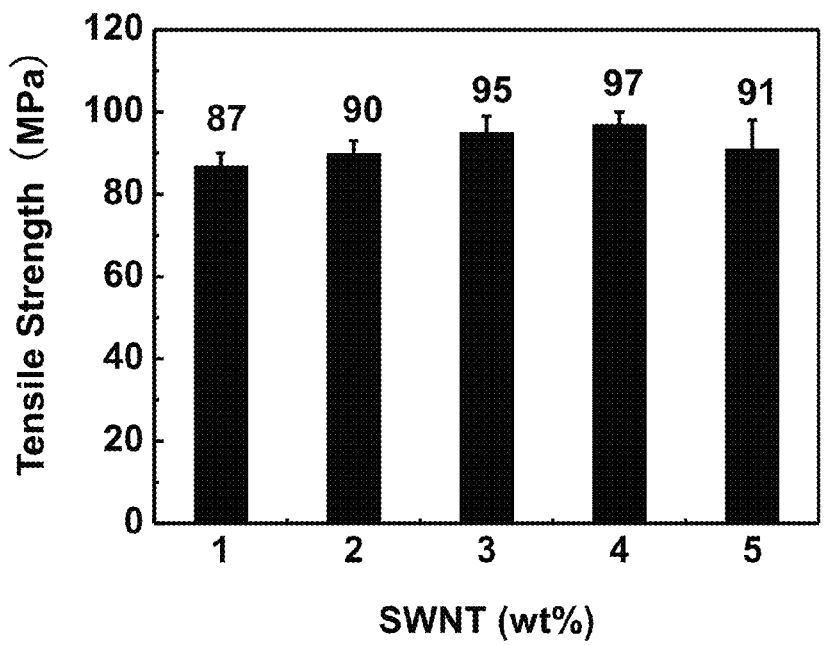
FIG. 9 shows tensile strength of PVA composite films loaded with varying weight percentages of SWNT coated by NaDDBS.

The effect of the amount of C-SWNT on the tensile strength of polymer/nanoparticle composite was determined using the ASTM Method described above. FIG. 9 shows the tensile strength of PVA composite films loaded with 1 wt. %, 2, wt. %, 3 wt. %, 4 wt. %, and 5 wt. % C-SWNT coated by NaDDBS. The tensile strengths of PVA reinforced with 1-4 wt. % C-SWNT increased with increasing C-SWNT concentration. The composite containing 4 wt. % C-SWNT displayed the highest tensile strength (97 MPa) of the five C-SWNT reinforced films, a 21% increase compared to the neat PVA film (80 MPa).

But the tensile strength improvement of the polymer/nanoparticle composites with 3-5 wt. % C-SWNT is not that noticeable when compared to the polymer/nanoparticle composites containing 1-3 wt % C-SWNT. The tensile strength of polymer/nanoparticle composite containing 5 wt. % C-SWNT was 91 MPa, which is a lower tensile strength than polymer/nanoparticle composites containing 3 or 4 wt. % C-SWNT. Further testing (see Example 4) confirms this is due to superfluous surfactant.

Example 3

Tensile Strength of Polymers Prepared with Differing Surfactant Parameters

In order to understand the dual effect of the surfactant on the tensile strength of polymer/nanoparticle composites, polymer films containing varying amounts of the surfactant NaDDBS were prepared.

Polymer films containing NaDDBS were prepared by mixing the PVA with distilled water and placing the mixture on a Fisher Scientific isotemp basic stirring hotplate. The mixture was heated and stirred at a temperature between about 70° C. and about 80° C. until no solid PVA could be observed in polymer solution. This took between 1-2 hours. NaDDBS was added such that it was 10 wt. %, 20 wt. %, 30 wt. %, 40 wt. %, and 50 wt. % of the solution. Upon the addition of NaDDBS the solution was heated and stirred. The polymer films were prepared using the drawdown process. The polymer/surfactant solutions were poured on the top center of horizontally-positioned glass sheets. A Mayer rod was drawn across the surface of each polymer/surfactant solution with a smooth and continuous movement from top to bottom so as to draw down a thin, continuous layer. The films were solidified for 24 hours allowing the excess water to evaporate. The films were removed from the glass sheet, allowed to solidify for additional time (about 40 hours), and tested for tensile strength.

Figure 10:
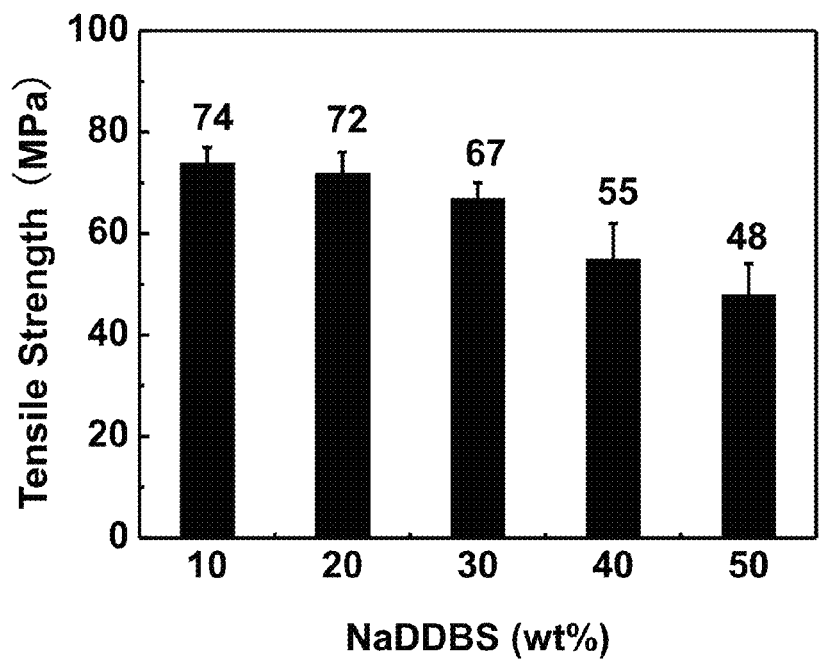
FIG. 10 shows the tensile strength of PVA films varying weight percentages of NaDDBS.

FIG. 10 shows the tensile strength of the polymer/surfactant films containing varying amounts of NaDDBS. Polymer films that contain the surfactant NaDDBS exhibited decreased tensile strength compared to neat PVA films. The decrease in tensile strength also seems to increase with increasing surfactant concentration. Specifically, the tensile strengths of PVA films containing 30, 40, and 50 wt. % NaDDBS exhibit decreased tensile strength with increasing surfactant concentration.

Example 4

Tensile Strength of Polymers with Differing Metal Oxide Parameters

Polymer/nanoparticle composites employing different weight percentages of metal oxide were prepared to evaluate the effect of the amount of the metal oxide on the present compositions, in particular to determine their tensile strengths compared to the pure polymer matrix. Neat polymer/nanoparticle composite films without the C-SWNT and containing varying amounts of $Fe_2O_3$ (0 wt. %, 5 wt. %, and 10 wt. %) were prepared and analyzed. They were prepared by adding the requisite amount of $Fe_2O_3$ to PVA, mixed, then sonicated.

Figure 11:
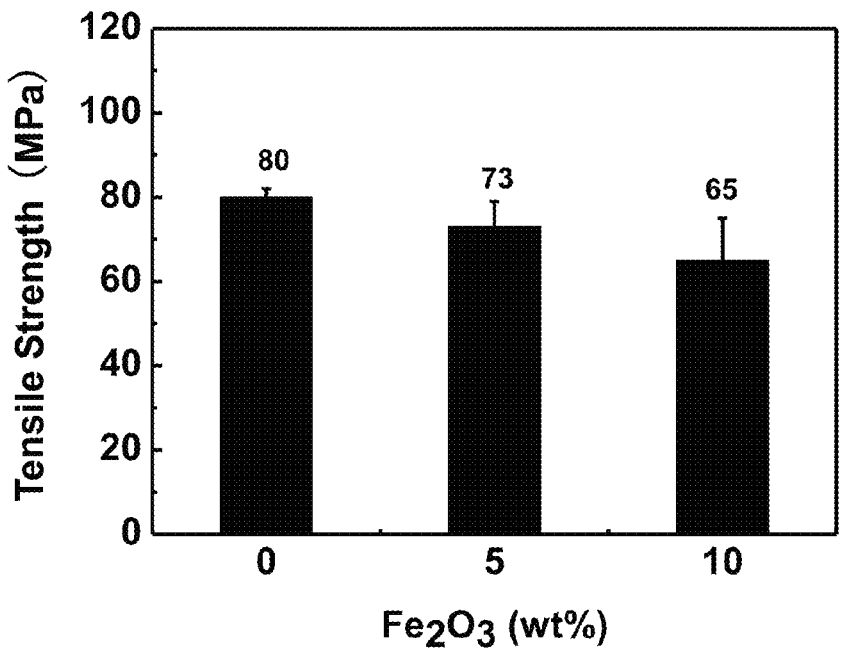
FIG. 11 shows the tensile strength of PVA films containing varying amounts of $Fe_2O_3$.

FIG. 11 shows the tensile strength of polymer/nanoparticle composite films containing 0 wt. %, 5 wt. %, and 10 wt. % of $Fe_2O_3$. Each film that contained the $Fe_2O_3$ exhibited decreased tensile strength compared to the neat polymer film. The neat polymer film with no $Fe_2O_3$ had a tensile strength of 80 MPa. The neat polymer film containing 5 wt. % of $Fe_2O_3$ had a tensile strength of 73 MPa. Finally, the neat polymer film containing 10 wt. % of $Fe_2O_3$ had a tensile strength of 65 MPa.

Example 5

Tensile Strength of Polymers Prepared with Differing Magnetic Field Parameters

Magnetically aligned polymer/nanoparticle composites containing magnetically sensitive nanoparticles prepared under different magnetic field parameters were analyzed to evaluate the effect of the magnetic field on the present compositions, in particular to determine their tensile strengths compared to the pure polymer matrix. Both the strength of the magnetic field and the amount of time that the compositions were subjected to the magnetic field were varied for analysis.

The polymer/nanoparticle composite films were prepared by adding magnetic sensitive nanoparticles to well dispersed composite films in the process of dispersion. While not wishing to be bound by this theory, it is believed that the C-SWNTs attached on $Fe_2O_3$ nanoparticles, dispersed in polymer, and were magnetically aligned with $Fe_2O_3$ nanoparticles under magnetic field. Although magnetic guided C-SWNT exhibited good alignment in solvents while $Fe_2O_3$ was embedded in a PVA matrix, the amount of $Fe_2O_3$ and the magnetic field strength affect the mechanical properties of polymer composites, including the tensile strength. Hence, the effect of $Fe_2O_3$ on the tensile strength of magnetically aligning PVA films was evaluated by varying the mount of $Fe_2O_3$ and the magnetic field strength.

The magnetic sensitive polymer composite films that contained metal oxide and surfactant-coated nanotubes were prepared by dissolving the dry PVA in distilled water using the same method used to prepare the neat polymer films. $Fe_2O_3$, NaDDBS, and C-SWNTs were added to water in desired ratio and then were dispersed in water using ultrasonication. The amount of surfactant and C-SWNTs was determined as a weight percent of the dry polymer. The C-SWNT was added in an amount equal to 2.5 wt. % and the NaDDBS was added in an amount equal to 25 wt. %. The metal oxide was added in three amounts: 0 wt. %, 5, wt. %, and 10 wt. %. The water/metal oxide/surfactant-coated nanotube solution was sonicated for 15 minutes at 35% amplitude. The water/metal oxide/surfactant-coated nanotube solution was then added to the PVA solution and the mixture was sonicated for 15 minutes at 35% amplitude to disperse the nanotubes in the polymer solution. The polymer nanocomposite solutions were then poured onto a glass sheet and the Mayer rod was drawn across the surface of the polymer solution from top to bottom so as to draw down a thin continuous layer. In the process of solvent evaporating, a magnetic field was applied to the composite film. The magnetic field was provided by a pair of spaced, Ba-ferrite magnet plates. The glass sheet was placed in the middle of the gap between the magnets. The strength of magnetization was adjusted by changing the distance between magnets and measured by a Gauss/Teslameter Model 5060. After 24 hours, the composite film was removed for further curing (about 40 hours) and tensile strength analysis.

Figure 12:
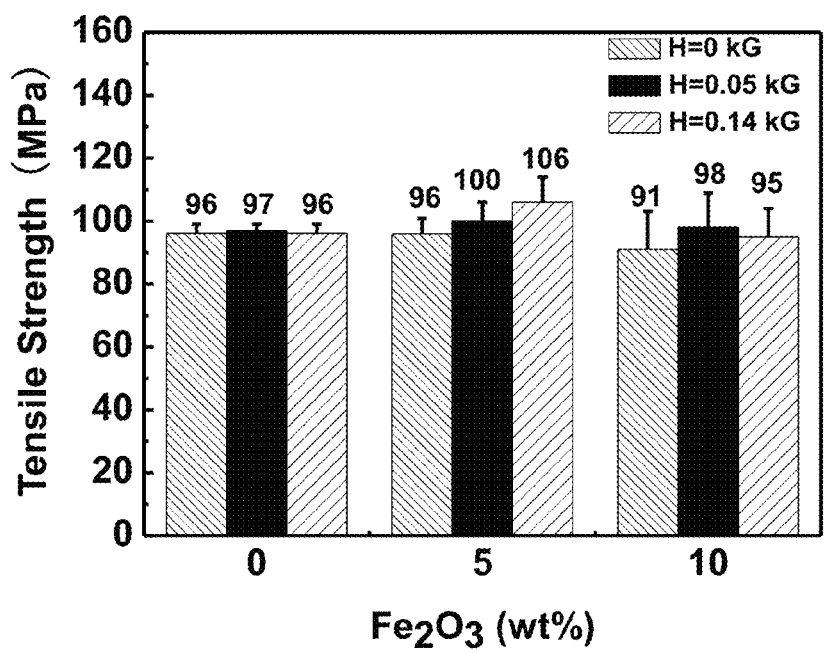
FIG. 12 shows the tensile strength of magnetically aligned PVA films containing varying amounts of $Fe_2O_3$ after being subjected different magnetic field strengths.

FIG. 12 shows the tensile strength of the magnetically aligning composite films containing varying amounts of $Fe_2O_3$ (0 wt. %, 5 wt. %, and 10 wt. %). Without magnetic field (H=0 kG), the magnetically aligning PVA films containing 5 wt. % and 10 wt. % $Fe_2O_3$ exhibit lower tensile strengths than the well-dispersed PVA films containing 0 wt. % $Fe_2O_3$. Furthermore, the tensile strength of the magnetically aligned composite films decreased with an increase in the amount of $Fe_2O_3$. While not wishing to be bound to this theory, this decrease is believed to be caused by having excess $Fe_2O_3$ particles existing as impurities in composite film, which results in a weaker structure. When a magnetic field of 0.05 kG was applied to the composite film, C-SWNT attached to the $Fe_2O_3$ nanoparticles and were able to align along with the magnetic field. When the magnetic was enlarged to a strength of 0.14 kG, the tensile strength of magnetically aligning composite films continued to increase. As the magnetic field intensity increasing, the $Fe_2O_3$ attached C-SWNTs grow longer and the tensile properties improved. However, excessive amounts of $Fe_2O_3$ in the composite resulted in a decrease in tensile strength. Again, not wishing to be bound to this theory, it is believed that excessive amounts of $Fe_2O_3$ acted as impurities, disrupting the structure of the composite and thereby weakening the tensile strength.

The amount of time that the compositions were subjected to the magnetic field was also varied to analyze its effect on the tensile strength of the compositions. The strength of the magnetic field was 0.2 kG. The composite films were subjected to the magnetic field for 0, 10, 20, and 60 minutes and 24 hours. Table 4 shows the tensile strength of the magnetically aligning composite films while the magnetic field was applied for 0, 10, 20, 60 minutes at the beginning of composite curing and 24 hours when the composite film was completely cured.

TABLE 4

| Magnification Duration | Tensile Strength (MPa) | Standard Deviation (MPa) |
|---|---|---|
| 0 min | 97 | 3 |
| 10 minutes | 100 | 5 |
| 20 minutes | 102 | 3 |
| 60 minutes | 110 | 6 |
| 24 hours | 106 | 5 |

The tensile strength increased with the duration prolonging, and reached to 110 MPa when exposed to the magnetic field for 60 minutes. While not wishing to be bound by this theory, it is believed that the increase in tensile strength was a result of C-SWNTs having more time to grow longer while subjected to the magnetic field. However, the tensile strength of composite films subjected to the magnetic field for the whole 24 hours curing process was less than the composite films which were only subjected to the magnetic field for 60 minutes. While not wishing to be bound by this theory, it is believed that when the magnetic field is applied to the composite films for the entire 24 hour solvent evaporation period, the C-SWNTs will grow longer and thicker and that as the C-SWNT bundles get thicker they eventually detach from each other. This would result in the decrease of tensile strength.

Example 6

Polymer Analysis Based on Differing Sonication Parameters

The effect of differences in sonication, both time and intensity, were analyzed on the present compositions. Sonication can serve to disperse the elements in the composition; however, over-sonication can actually damage the C-SWNTs. Mixtures of the ingredients were prepared with PVA, 2.5 wt. % C-SWNT, and 25 wt. % NaDDBS according the methods set forth above in Example 3, except that the sonication was varied. The sonication was varied in intensity at amplifications of 10%, 20%, 30%, 50%, and 70%. The mixtures were not submitted to a magnetic field and were not solidified.

Figure 13:
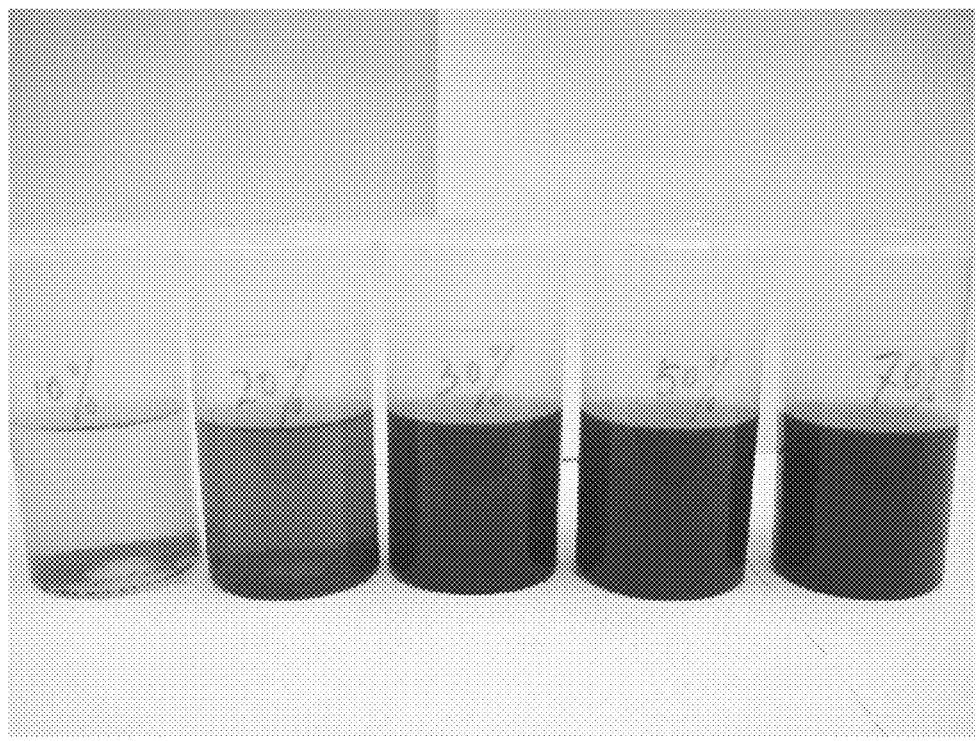
FIG. 13 shows a photograph of 2.5 wt. % SWNT dispersion PVA solutions prepared by varying sonication intensities and allowed to settle for 30 days.

FIG. 13 shows the macroscopic behavior of 2.5 wt % C-SWNT in PVA solutions prepared by varying sonication powers (10%, 20%, 30%, 50%, 70% amplification) for 15 minutes and settled for 30 days. It is clearly noticeable that at 10% and 20% amplification, the C-SWNT dispersion is unstable in a PVA solution—the system separated into two phases with a clear liquid and precipitant. At 30%-70% amplification, the C-SWNT appears to be in a stable dispersion in a PVA solution—there is a homogeneous black dispersion, which has remained stable for 30 days.

Figure 14:
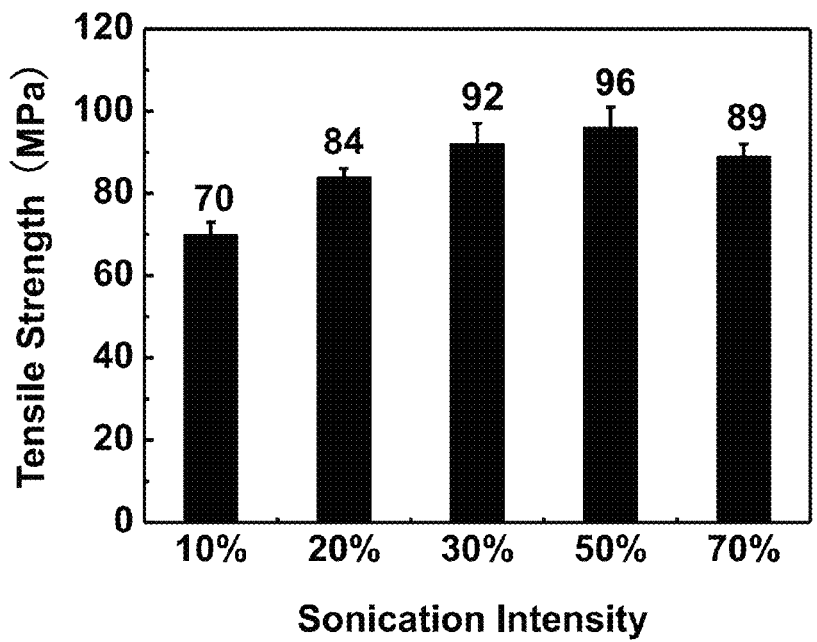
FIG. 14 shows the tensile strength of 2.5 wt. % SWNT dispersion of PVA solutions prepared at varying sonication intensities.

FIG. 14 shows the tensile strength of the 2.5 wt % C-SWNT dispersion in a PVA solution prepared at the various sonication intensities for 20 minutes. At 10% and 20% amplification, the sonication intensity was not strong enough to disperse SWNT and resulted in decrease of tensile strength. Also, tensile strength of PVA films was decreased by strong power of sonication at 70% amplification. While not wishing to be bound by this theory, it is believed that sonicating with too strong an intensity can result in damage to the SWNT and shortening of the length of the SWNT, ultimately resulting in a decrease in the tensile strength.

Figure 15:
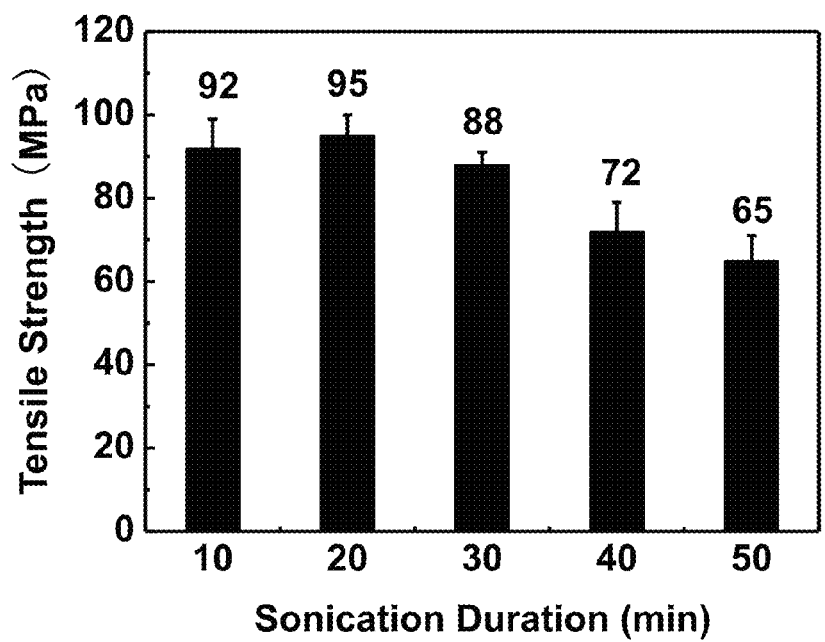
FIG. 15 shows the tensile strength of well dispersed PVA films prepared after varying sonication durations.

FIG. 15 shows the tensile strength the 2.5 wt % C-SWNT dispersion in a PVA solution prepared at 30% amplification for varying sonication durations (10, 20, 30, 40, and 50 minutes). As can be seen, sonication for more than 30 minutes will result in a significant decrease in tensile strength.

In light of these sonication experiments, a preferred embodiment of the present method includes sonication duration of about 10-20 minutes, and sonication intensity of about 30%-50% amplification.

Example 7

Tensile Strength of Polymers Prepared with Differing Temperature Parameters Magnetically aligned polymer/nanoparticle composites containing magnetically sensitive nanoparticles prepared under different evaporating parameters were analyzed to evaluate the effect on the present compositions, in particular to evaluate the effect on tensile strength. Both the evaporation temperature and drying duration were varied and analyzed.

Figure 16:
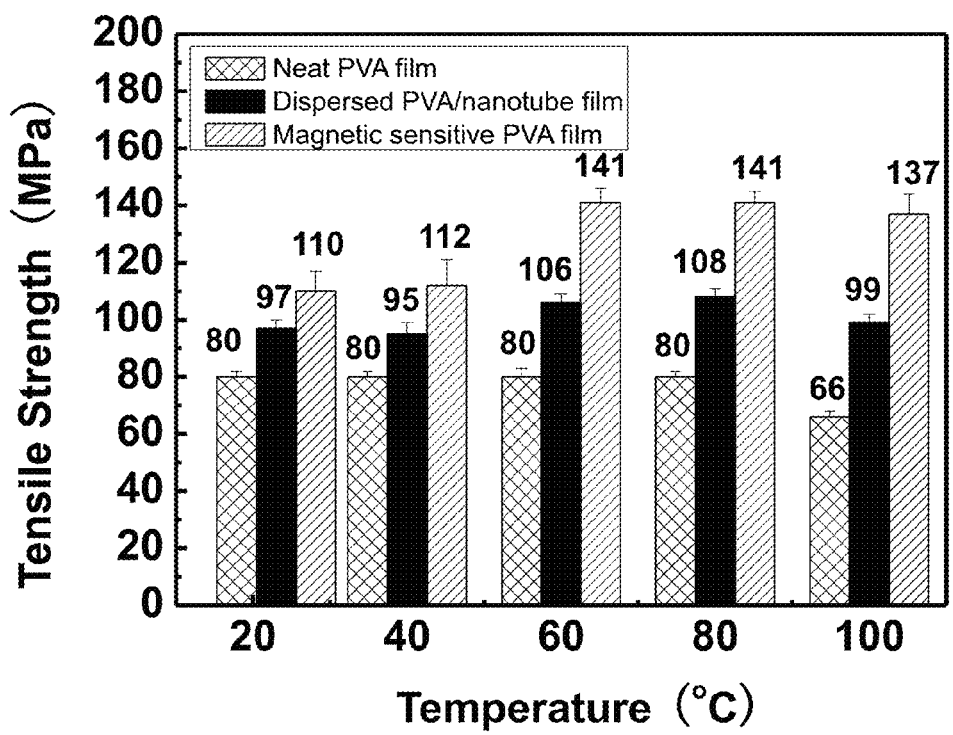
FIG. 16 shows the tensile strength of varying composite films prepared with varying drying temperatures.

FIG. 16 shows the tensile strength of composite films (neat PVA film, well-dispersed polymer film, and magnetically-aligned polymer film) varying the drying temperature. The temperatures tested were 20, 40, 60, 80, and 100° C. The films were subjected to the temperatures in a vacuum oven for one hour. The neat PVA film did not demonstrate any tensile strength differences between temperatures of 20-80° C.; however, at 100° C. the neat PVA film exhibited a decrease in tensile strength, from 80 MPa to 66 MPa. The well-dispersed PVA/nanotube film demonstrated a general increase in tensile strength as the drying temperature increased between 20° C. and 80° C.; however, at 100° C., the well-dispersed PVA/nanotube film decreased to 99 MPa. The magnetically-aligned PVA film demonstrated the greatest increase in tensile strength as the temperature rose from 20° C. to temperatures above 60° C., with its greatest strength of 141 MPa at both 60° C. and 80° C. However, at 100° C. the magnetically-aligned PVA film also decreased in tensile strength (137 MPa).

Drying duration of composite films in vacuum oven was also analyzed. Table 5 show the tensile strength of composite films drying for varying duration at 75° C. After drying in a vacuum oven for 2 hours, the tensile strength of composite exhibited a spike on the cure, which means the most suitable duration for composite drying.

Example 8

Electrical Conductivity of Carbon Nanoparticle—Epoxy Composites

Epoxy resin is widely used in applications ranging from microelectronics to aerospace. However, to develop high performance SWNT/polymer composites, the main problems and challenging tasks are in creating a good dispersion, good alignment and strong interface bonding of CNTs in the polymer matrix, forming a structural frame and electrical conducting path, attaining good load transfer from the matrix to the CNTs during loading, and increasing the electrical conductivity.

TABLE 5

| | Tensile Strength (MPa) | |
|---|---|---|
| Drying Duration (hours) | Dispersed PVA/ nanotube film | Magnetic sensitive PVA film |
| 0 | 96 | 100 |
| 1 | 112 | 110 |
| 2 | 118 | 141 |
| 3 | 118 | 131 |
| 4 | 114 | 128 |
| 5 | 111 | 126 |
| 10 | 114 | 126 |
| 20 | 100 | 126 |
| 25 | 105 | 109 |

The electrical conductivity of the West System 105 epoxy is equal to $5.6 \times 10^{-13}$ according to West System Company. Samples were prepared by dispersing SWNTs and surfactant in West System 105 epoxy and subjecting it to a magnetic field. The electrical conductivity measurements show no improvement after applying a magnetic field. In light of this, it was determined that the SWNTs did not align in the epoxy host material despite being subjected to the magnetic field.

The electrical conductivity of the neat epoxy is almost $1.0 E^{-13}$ $Scm^{-1}$. The electrical conductivity for 1.0 wt % of SWNTs nanocomposites was found to be almost $1.0E^{-4}$, which is consistent with other studies in literature. Table 6 shows the electrical conductivity of neat epoxy composites with different weight percentages of carbon nanoparticles prepared according to known methods of preparing neat epoxy composites.

TABLE 6

| Electrical Conductivity of CNT/Epoxy Composites | | |
|---|---|---|
| Carbon Nanotubes (wt. %) | 1.0 wt % | 2.0 wt % |
| Electrical conductivity (S/cm) | 3.8E−04 | 3.11E−04 |

Magnetically aligned carbon nanotube epoxies were prepared according to following method. West System 105 epoxy and West System 206 Hardener were used. C-SWNTs and MSPs were added to a solvent and mixed. Surfactant was added to the mixture and it was physically agitated by sonication. Following sonication, the mixture of C-SWNTs, MSPs, and surfactant was dried through a solvent evaporation step. The dried C-SWNT, MSP, and surfactant mixture was added to the liquid epoxy and physically agitated to disperse the liquid composite. The liquid composite was subjected to a magnetic field and curing at room temperature for 24 hours. The magnetically aligned composite prepared according to the present methods was compared with non-magnetically aligned composite. The results comparing different weight percentages of C-SWNTs are provided in Table 7.

TABLE 7

| Electrical Conductivity of Magnetically Aligned CNT/Epoxy Composites | | | |
|---|---|---|---|
| Carbon Nanotubes (wt. %) | 0.2 wt % | 0.3 wt % | 0.5 wt % |
| Not Magnetically Aligned | 1.75E−06 | 3.08E−06 | 5.8E−06 |
| Magnetically Aligned | 1.12E−03 | 2.58E−03 | 5.53E−03 |

The data provided in Table 7 demonstrates the electrical conductivity for the magnetically aligned nanocomposites prepared according to the present methods have a substantial increase in electrical conductivity, about three orders of magnitude.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A magnetically aligned carbon nanoparticle composite composition comprising:
   carbon nanoparticles, a host material, magnetically sensitive nanoparticles, and a surfactant, wherein said magnetically sensitive nanoparticles are present in the composition from about 1 wt. % to about 15 wt. %, wherein said surfactant attaches to the carbon nanoparticles thereby connecting the carbon nanoparticle with the magnetically sensitive nanoparticles by electrostatic attraction; wherein said composition is magnetically aligned and, once magnetically aligned, has increased electrical conductivity of at least three orders of magnitude, in at least one direction, relative to a composite having the same composition without magnetic alignment.

2. The composition of claim 1, wherein the carbon nanoparticle comprises at least one of the following graphene, carbon nanotubes, fullerene, carbon nanotube fiber and carbon fiber.

3. The composition of claim 1, wherein the magnetically sensitive nanoparticles comprise at least one of the following cobalt, vanadium, manganese, niobium, iron, nickel, copper, silicon, titanium, germanium, zirconium, tin, magnetically sensitive rare earth metals, oxides of the aforementioned metals, and combinations and alloys of the aforementioned metals and/or metal oxides.

4. The composition of claim 1 wherein the magnetically sensitive nanoparticles are selected from the group consisting of NdFeB, Fe, $Fe_2O_3$, $Fe_3O_4$, Ni, NiO, $Ni_2O_3$, Co, CoO, $Co_2O_3$, and $Co_3O_4$, and combinations thereof.

5. The composition of claim 1 wherein the surfactant has a net negative charge and the pH value of the composition in a liquid state is more than the pHpzc of magnetically sensitive nanoparticles, or the surfactant has a net positive charge ad the pH value of the composition in a liquid state is less than the pHpzc of magnetically sensitive nanoparticles.

6. The composition of claim 5 wherein the surfactant has a net negative charge and comprises sodium dodecylbenzene sulfonate or has a net positive charge and comprises cetyl trimethylammonium bromide.

7. The composition of claim 1, wherein the host material comprises at least 40 wt. % of the composition, wherein the carbon nanoparticles are about 0.01 wt. % to about 20 wt. %, wherein the surfactant is about 0.01 wt. % to about 20 wt. %, wherein the ratio of nanoparticles to surfactant is between about 1:1 and about 1:20.

8. The composition of claim 1, wherein the host material comprises at least 45 wt. % of the composition, wherein the carbon nanoparticles are about 0.1 wt. % to about 8 wt. %, wherein the magnetically sensitive nanoparticles are about 1 wt. % to about 10 wt. %, wherein the surfactant is about 2 wt. % to about 40 wt. %, and wherein the ratio of nanoparticles to surfactant is between about 1:5 and about 1:15.

9. The composition of claim 8, wherein the magnetically sensitive nanoparticles are about 1 wt. % to about 10 wt. %.

10. The composition of claim 9, wherein the composition has increased electrical conductivity of at least about four orders of magnitude relative to a composite having the same composition without magnetic alignment.

11. The composition of claim 1, wherein the host material is selected from the group consisting of ceramics, thermoplastic polymers, thermoset polymers, alloys, metalloids, and combinations thereof.

12. The composition of claim 1, wherein the host material is selected from the group consisting of epoxy, anionic polyamide-6, or c-PBT.

13. A magnetically aligned carbon nanoparticle composite prepared by a process comprising:
   providing a host material in a liquid state;
   adding carbon nanoparticles, magnetically sensitive nanoparticle, and surfactant to the liquid host material to form a liquid composite, wherein said surfactant attaches to the carbon nanoparticles thereby connecting the carbon nanoparticles with the magnetically sensitive nanoparticles by electrostatic attraction, and wherein said magnetically sensitive nanoparticles are added in an amount between about 1 wt. % and about 15 wt. %;
   optionally, physically agitating the liquid composite;
   solidifying; and
   applying a magnetic field to the liquid composite during, and/or prior to, the solidifying step; and
   forming a magnetically aligned carbon nanoparticle composite, wherein said magnetically aligned carbon nanoparticle composite has increased electrical conductivity of at least three orders of magnitude, in at least one direction, relative to a composite having the same composition without magnetic alignment.

14. The composite prepared by the process of claim 13, wherein the liquid state of the host material is a resin that can be solidified by curing, or a polymer solution that can be solidified by solvent evaporation, or a molten polymer that can be solidified by cooling, or a monomer or oligomer that can be solidified by in-situ polymerization, and combinations thereof.

15. The composite prepared by the process of claim 13, wherein the host material is selected from the group consisting of thermoset polymers, thermoplastic polymers, ceramics, metalloids, alloys, and combinations thereof, and is added in an amount to constitute between about 30 wt. % and about 99.9 wt. %; wherein the carbon nanoparticles are added in an amount between about 0.01 wt. % and about 10 wt. %; wherein the magnetically sensitive nanoparticles are added in an amount between about 1 wt. % and about 10 wt. %; wherein the surfactant is added in an amount between about 0.01 wt. % and about 60 wt. %; and wherein the ratio of nanoparticles to surfactant is between about 1:1 and about 1:20.

16. The composite prepared by the process of claim 13, wherein the physical agitation of the liquid composite comprises mixing, stirring, ultrasonication, milling, or a combination thereof; wherein the surfactant has a net negative charge and the pH value of the liquid composite is more than the pHpzc of magnetically sensitive nanoparticle, or the surfactant has a net positive charge and the pH value of the liquid composite is less than the pHpzc of magnetically sensitive nanoparticles; wherein the liquid host material is in a molten state or dissolved in a solvent.

17. The composite prepared by the process of claim 13, wherein the physical agitation comprises ultrasonication for a duration of between about 5 seconds and about 50 minutes; and wherein said magnetic field has a strength of between about 0.01 kG, and about 1 TG, and wherein said magnetic field is applied for less than about 10 seconds and up to about 72 hours.

18. The composite prepared by the process claim 13, further comprising before the adding step, adding the carbon nanoparticles, magnetically sensitive nanoparticles, and surfactant to a solvent and physically agitating the carbon nanoparticles, magnetically sensitive nanoparticles, and surfactant in solvent, and evaporating said solvent.

* * * * *